United States Patent
Brdiczka et al.

(10) Patent No.: US 11,829,710 B2
(45) Date of Patent: Nov. 28, 2023

(54) DERIVING GLOBAL INTENT FROM A COMPOSITE DOCUMENT TO FACILITATE EDITING OF THE COMPOSITE DOCUMENT

(71) Applicant: Adobe Inc., San Jose, CA (US)

(72) Inventors: Oliver Brdiczka, San Jose, CA (US); Sanat Sharma, Austin, TX (US); Jayant Kumar, San Jose, CA (US); Alexandru Vasile Costin, Monte Sereno, CA (US); Aliakbar Darabi, Newcastle, WA (US); Kushith Amerasinghe, Santa Rosa, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/583,818

(22) Filed: Jan. 25, 2022

(65) Prior Publication Data

US 2023/0237251 A1 Jul. 27, 2023

(51) Int. Cl.
   *G06F 40/166* (2020.01)
   *G06F 40/106* (2020.01)
   *G06F 16/58* (2019.01)
   *G06F 40/12* (2020.01)
   (Continued)

(52) U.S. Cl.
   CPC ........ *G06F 40/166* (2020.01); *G06F 16/5866* (2019.01); *G06F 40/106* (2020.01); *G06F 40/12* (2020.01); *G06F 16/38* (2019.01); *G06V 30/413* (2022.01)

(58) Field of Classification Search
   CPC ............................. G06F 40/166; G06F 16/5866
   See application file for complete search history.

(56) References Cited

U.S. PATENT DOCUMENTS

| 6,263,507 | B1 | 7/2001 | Ahmad et al. |
| 9,449,080 | B1* | 9/2016 | Zhang ................. G06F 16/3346 |
| 10,031,656 | B1 | 7/2018 | Tseng et al. |

(Continued)

OTHER PUBLICATIONS

Barnes, Connelly, et al., "Video Tapestries with Continuous Temporal Zoom", SIGGRAPH '10: ACM SIGGRAPH 2010 Papers, Article No. 89, Jul. 2010, pp. 1-8.

(Continued)

*Primary Examiner* — Scott T Baderman
*Assistant Examiner* — Seung Woon Jung
(74) *Attorney, Agent, or Firm* — Kilpatrick Townsend & Stockton LLP

(57) ABSTRACT

An illustrator system accesses a multi-element document, the multi-element document including a plurality of elements. The illustrator system determines, for each of the plurality of elements, an element-specific topic distribution comprising a ranked list of topics. The illustrator system creates a first aggregated topic distribution from the determined element-specific topic distributions. The illustrator system determines a global intent for the multi-element document, the global intent including one or more terms from the first aggregated topic distribution. The illustrator system queries a database using the global intent to retrieve a substitute element. The illustrator system generates a replacement multi-element document that includes a substitute element in place of an element in the multi-element document The at least one substitute element is different from the element in the displayed multi-element document.

20 Claims, 10 Drawing Sheets

(51) Int. Cl.
*G06F 16/38* (2019.01)
*G06V 30/413* (2022.01)

(56) References Cited

U.S. PATENT DOCUMENTS

| | | |
|---|---|---|
| 2009/0106674 A1 | 4/2009 | Bray et al. |
| 2011/0010350 A1 | 1/2011 | Bhogal et al. |
| 2015/0178391 A1 | 6/2015 | Villaron |
| 2016/0148407 A1 | 5/2016 | Hodges et al. |
| 2016/0246487 A1 | 8/2016 | Németh et al. |
| 2018/0032606 A1 | 2/2018 | Tolman et al. |
| 2019/0272328 A1 | 9/2019 | Dubyak et al. |
| 2021/0109958 A1* | 4/2021 | Behtash .................. G06F 40/20 |
| 2022/0139041 A1* | 5/2022 | Li ...................... G06F 16/9558 |
| | | 345/419 |
| 2022/0414320 A1* | 12/2022 | Dolan .................. G06F 40/169 |

OTHER PUBLICATIONS

U.S. Appl. No. 17/737,452 , "Non-Final Office Action", dated Jul. 17, 2023, 28 pages.

\* cited by examiner

DERIVING GLOBAL INTENT FROM A COMPOSITE DOCUMENT TO FACILITATE EDITING OF THE COMPOSITE DOCUMENT

TECHNICAL FIELD

This disclosure generally relates to suggesting editing operations for composite or layered documents. More specifically, but not by way of limitation, this disclosure relates to systems for generation and suggestion of replacement composite documents in accordance with determined intents of composite or layered documents.

BACKGROUND

Conventional approaches for deriving an intent, purpose, or topic for a composite document (e.g. a layered document or document with multiple content) involve rasterizing the composite document into a single image and then determine the intent via image classification or tagging or extraction of text from the rasterized image. However, the conventional approaches do not provide accurate results in instances where different regions or layers of the document include contradictory information, since the document is treated as a single rasterized image. Also, because conventional approaches rasterize the composite document to treat it as a single image, the conventional approaches do not consider occluded portions of the document when determining the intent, which can occur in composite documents (e.g. layered documents). Therefore, conventional approaches may suffer from inaccurate intent determinations in some instances due to lack of consideration of all information in a document and/or lack of consideration of specific regions or layers of the document.

SUMMARY

The present disclosure describes techniques for using an illustrator system to determine a global intent for a multi-element canvases and generate previews of suggested replacement multi-element canvases in accordance with the determined global intent. For example, an illustrator system accesses a multi-element document, the multi-element document including a plurality of elements. The illustrator system determines, for each of the plurality of elements, an element-specific topic distribution comprising a ranked list of topics. The illustrator system creates a first aggregated topic distribution from the determined element-specific topic distributions. The illustrator system determines a global intent for the multi-element document, the global intent comprising one or more terms from the first aggregated topic distribution. The illustrator system queries a database using the global intent to retrieve a substitute element. The illustrator system generates a replacement multi-element document that includes a substitute element in place of an element in the multi-element document, wherein the at least one substitute element is different from the element in the displayed multi-element document.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
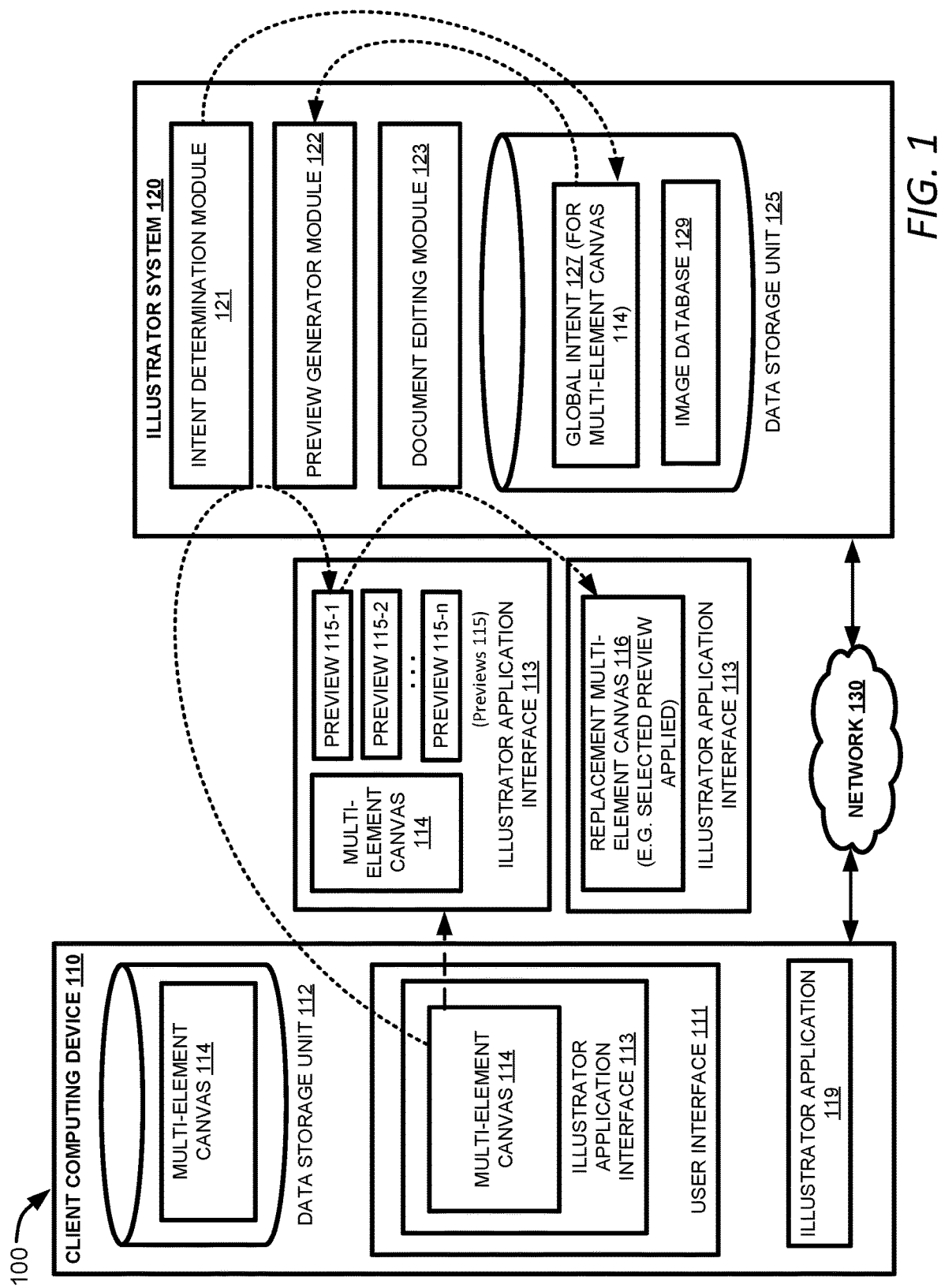
FIG. 1 depicts an example of a computing environment for determining a global intent for a multi-element canvas and generating, based on the global intent, a preview of a suggested replacement multi-element canvas, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional systems by providing a system to automatically determining a global intent for a multi-element electronic document (e.g. a layered multi-element canvas) and generating, based on the global intent, a preview of a replacement multi-element document for the multi-element electronic document, wherein the preview can be used for modifying online computing environments or other systems. Certain embodiments described herein improve the performance of conventional illustrator systems by, for example, determining a global intent for a multi-element electronic document based on an element-specific intents of each element of the multi-element electronic document, which improves an accuracy of classification of a multi-element electronic document and improves an accuracy, usefulness, or relevancy of replacement multi-element documents, based on the classification.

The following non-limiting example is provided to introduce certain embodiments. In this example, an illustrator system accesses a multi-element document, for example, a multi-element canvas. The multi-element canvas may be stored in a database accessible to the illustrator system. In some instances, the multi-element canvas may be displayed on a user interface of a client device executing an illustrator application that communicates with the illustrator system via a network. For example, the illustrator application may provide an illustrator application interface that enables viewing and editing of the multi-element canvas via the client device. The multi-element canvas includes a plurality of elements. In some instances the multi-element document is a layered document including a plurality of layers. Elements can include multiple image elements and/or text elements. Elements could include layers in the multi-element canvas. For example, the multi-element canvas could include a background layer, with a text layer in front of the background layer, and an image layer in front of the text layer. In some instances, elements can further include edits made to the multi-element canvas, including an addition of an element, a deletion of an element, a duplication of an element, modifying one or more features of an element (e.g. size, orientation, font size, color, or other feature), or other edits to one or more elements in the multi-element canvas. Certain elements of the multi-element canvas may partially or completely overlap or occlude other elements of the multi-element canvas. For example, an image element or layer may partially or completely occlude a text element or layer, or vice versa.

The illustrator system determines an element-specific topic distribution for each element of the multi-element canvas. For text elements (e.g. extracted text, a text box, a text layer, or other text element), the illustrator system determines whether the text element includes text that is longer than a threshold length. For text elements including text that is longer than the threshold length, the illustrator system inputs the text to a machine learning model to determine an element-specific topic distribution for the text element. For example, the element specific topic distribution output by the machine learning model is a ranked list of topics ranked according to a score assigned to each topic by the machine learning model. The machine learning model is trained to determine a topic distribution associated with an input text. For text elements including text that is less than or equal to the threshold length, the illustrator system queries a document database with various portions of the text to find documents (e.g. images, other multi-element canvases) that are tagged with topic labels. The illustrator system determines an element-specific topic distribution based on the retrieved tagged documents that includes a list of topics and a score associated with each topic. The score is based on a number of instances of each topic label in the retrieved tagged documents. For image elements (e.g. an image layer, an image object, a region of a multi-element document), the illustrator system retrieves tags for the image element, generates a description of the image based on the tags using a model, and determines an element-specific topic distribution for the image element by mapping the tags and/or the description to word embeddings associated with topics and then finding a distribution of the received topics For example, the element specific topic distribution is a score that is determined based on a number of times each topic is retrieved via the mapping of the tags and/or the description to the word embeddings. In some instances, the illustrator system concatenates all text elements (e.g. text layers, text objects, etc.) into a combined text and determines an element specific topic distribution for the combined text, including a list of topics and a score for each topic. In certain embodiments, the scores associated with topics in the determined element-specific topic distributions fall within a predefined range (e.g. 0 to 10, 0 to 100, or other predefined range) or are normalized to fall within a predefined range. For example, the element-specific topic distributions include, for each element and any combined text (from concatenating multiple text elements), a list of topics and a score associated with each topic in the list of topics. In certain embodiments, the illustrator system ranks the element-specific topic distributions based on their scores.

The illustrator system determines a global intent for the multi-element canvas based on element-specific topic distributions determined for each element of the multi-element canvas. To determine the global intent, the illustrator system removes, from each element-specific topic distribution, all topics except for a predefined number of topics (e.g. three, five, ten, or other predefined number). For example, the illustrator system may generate reduced element-specific topic distributions by removing all topics from each element-specific topic distribution except for the predefined number of topics having a greatest score associated with the respective topics. The illustrator system creates a first aggregated topic distribution by combining the reduced element-specific topic distributions. The illustrator system determines a subset of edited and/or displayed elements in the multi-element canvas including (1) elements that have been edited within the multi-element canvas and/or (2) elements that are currently selected (e.g. currently selected in a user interface of an illustrator application of a client device) in the multi-element canvas. The illustrator system creates a second aggregated topic distribution by combining reduced element-specific topic distributions associated with each of the subset of edited and/or currently selected elements. In certain embodiments, the illustrator system determines the global intent by combining a predefined number of topics (e.g. three topics) from the first aggregated topic distribution with a predefined number of topics (e.g. one topic) from the second aggregate topic distribution.

In certain embodiments, the illustrator system generates multiple previews to display with the multi-element canvas in an illustrator application interface. Each of the previews are associated with a replacement multi-element canvas. When a preview is selected, the replacement multi-element canvas associated with the selected preview replaces the multi-element canvas in the illustrator application interface. In an example, a replacement multi-element replacement canvas associated with a preview could be generated by creating a new canvas that includes one or more substitute elements (e.g. text elements, image elements, or other elements) that are similar to one or more elements (e.g. text elements or image elements) of the multi-element canvas retrieved and/or generated by the illustrator system. For example, to generate the replacement multi-element canvas, the illustrator system may substitute a text element of particular characteristics (e.g. font, size, style, color, or other characteristic) of the multi-element canvas with a substitute text element in the replacement multi-element canvas. In some instances, multiple previews can be displayed in the user interface in the multi-element canvas, each of the multiple previews being associated with a replacement multi-element canvas. The replacement multi-element canvas could, when compared to the multi-element canvas, substitute an image layer in the multi-element canvas with a new image element in the replacement multi-element canvas while also including other elements unchanged from the multi-element canvas. For example, the multi-element canvas includes elements A, B, and C, and the replacement multi-element canvas includes elements, A, B, and D, where element D has one or more similar visual features to element C but is not the same element as element C. In certain embodiments, the illustrator system displays previews in the illustrator application interface in which the multi-element canvas is displayed. The previews are interface objects that provide an indication of a visual look of the replacement multi-element canvas. In some instances, multiple previews can be displayed in the user interface with the multi-element document, each of the multiple previews being associated with a respective replacement multi-element canvas generated by the illustrator system. Responsive to receiving a selection of a preview via the user interface, the illustrator system replaces the currently displayed multi-element canvas with a replacement multi-element canvas associated with the selected preview.

In certain embodiments, when generating a replacement multi-element canvas and a preview for the replacement multi-element canvas, the illustrator system substitutes one or more elements from the multiple-element canvas unchanged and substitutes one or more elements of the multi-element canvas in the replacement multi-element canvas. To replace an image element, the illustrator system searches an image element database for images that are similar to the image element. The illustrator system may search for images that are tagged with topics included within the global intent determined for the multi-element document and then, from the retrieved images, determine a similarity of each of the retrieved images to the image element. The illustrator system can determine the similarity between a retrieved image and the image element based on (A) a comparison of visual features in the retrieved image to visual features of the image element and/or (B) based on a number of topic or intent tags of the retrieved image that match topic or intent tags of the image element. The illustrator system selects, from the retrieved images, the retrieved image that has a greatest similarity to the image element as a substitute for the image element. In certain embodiments, the illustrator system detects a region in the retrieved image that corresponds to a region of the image element and resizes and/or realigns the retrieved image using an optimization algorithm so that the region in the retrieved image is aligned with the region of the image element. The illustrator system generates a replacement multi-element canvas that includes the resized and/or realigned retrieved image as a replacement element to replace the image element. The illustrator system provides, for display in the user interface with the multi-element document, a preview associated with replacement multi-element canvas that provides a visual preview of the replacement multi-element canvas. The illustrator system displays the replacement multi-element document instead of the multi-element document responsive to receiving a selection of the preview via the user interface.

In certain embodiments, the illustrator system receives a selection of an element (e.g. an image element or a text element) of a multi-element canvas displayed on an illustrator application interface. The illustrator system generates a set of replacement multi-element canvases and also a set of previews for display in the illustrator application interface with the multi-element canvas. Each preview of the set of previews is associated with a suggested replacement multi-element document. Each preview displays a visual of how the replacement multi-element document would look. Responsive to receiving a selection of a preview via the user interface, the illustrator system replaces the multi-element canvas with a replacement multi-element canvas associated with the selected preview.

As used herein, the term "multi-element canvas" is used to refer to a document that includes multiple elements. The multi-element canvas may be a layered document or other composite document. The multi-element canvas may be displayed in an illustrator application interface.

As used herein, the term "element" is used to refer to a layer, a region, or other object in a multi-element canvas. Some examples of elements include text objects, text layers, image objects, image layers, background layers, background objects, regions of an image object, and regions of a text object.

As used herein, the term "element-specific topic distribution" is used to refer to a list of topics, terms, or labels associated with an element of a multi-element document and a probability, frequency, or other score for each of the topics. In certain examples, the list of topics in the element-specific topic distribution is ranked.

As used herein, the term "global intent" is used to refer to a sequence of topics, terms, or labels determined based at least in part on an aggregation of the element-specific topic distributions associated with the elements of the multi-element document.

Example Operating Environment for Determining a Contrast Group from a Set of Recommendable Items Referring now to the drawings, FIG. 1 depicts an example of a computing environment 100 for determining, by an illustrator system 120, a global intent for a multi-element canvas and generating, based on the global intent, a set of replacement multi-element canvases and previews 115 of each the set of replacement multi-element canvases 116. The computing environment 100 includes an illustrator system 120, which can include one or more processing devices that execute an intent determination module 121, a preview generator module 122, and a document editing module 123. The computing environment 100 includes a client computing device 110, which includes a user interface 111 and an illustrator application 119. In certain embodiments, the illustrator system 120 is a network server or other computing device connected to a network 130. The illustrator system 120 accesses or otherwise receives a multi-element canvas 114 and determines a global intent 127 for the multi-element canvas 114. The illustrator system 120 may receive the multi-element canvas 114 from the client computing device 110 or otherwise access the multi-element canvas 114 that is displayed in an illustrator application interface 113 of the client computing device 110. For example, the illustrator application interface 113 is a window or other application interface of the illustrator application 119 displayed on the user interface 111 through which the user interacts with the multi-element canvas. The illustrator system 120 generates a replacement multi-element canvas in which a text element from the multi-element canvas is substituted with a replacement text element in which one or more features (e.g. font, size, style, color, or other characteristic) are different from the corresponding characteristic or characteristics in the text element of the multi-element document. In some examples, the illustrator system 120 generates the replacement text element based on the determined global intent 127 for the multi-element canvas 114. To generate the replacement text element based on the determined global intent 127, the illustrator system 120 accesses a database, table, or other data structure that associates one or more fonts or other text styles to topics. The illustrator system 120 generates a replacement text element that applies one or more of the fonts or other text styles associated with one or more of the topics in the determined global intent 127. In some examples, the illustrator system 120 generates a replacement multi-element canvas 116 in which an image element from the multi-element canvas 114 is substituted with a replacement image element that is different from the corresponding image element in the multi-element canvas 114. The illustrator system 120 generates and displays a preview 115 associated with the replacement multi-element canvas 116. The preview 115 is a user interface object displayed in the illustrator application interface 113 that provides a visual preview of the replacement multi-element canvas 116. In certain embodiments, the illustrator system 120 generates multiple previews 115 (e.g. previews 115-1, 115-2, . . . 115-n) for the multi-element canvas 114, where each of the multiple previews 115 is associated with a respective replacement multi-element canvas 116. When a preview 115 is selected (e.g. via selection of the preview 115 via the illustrator application interface 113), the illustrator system 120 updates the illustrator application interface 113 to display the replacement canvas 116 associated with the preview 115. In an example, the illustrator system 120 generates a replacement multi-element canvas 116 in which one or more elements (e.g. text elements or image elements) from the multi-element canvas 114 are substituted with one or more replacement elements retrieved and/or generated by the illustrator system 120. For example, the illustrator system 120. In some instances, multiple previews 115 can be displayed in the illustrator application interface 113, each of the multiple previews 115 being associated with a replacement multi-element canvas 114.

The illustrator system 120 (including the intent determination model 121, the preview generator module 122, and/or the document editing module 123) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the illustrator system 120 (including the intent determination model 121, the preview generator module 122, and/or the document editing module 123) can be implemented using more or fewer systems or subsystems than those shown in FIG. 1, may combine two or more subsystems, or may have a different configuration or arrangement of the systems or subsystems.

Figure 2:
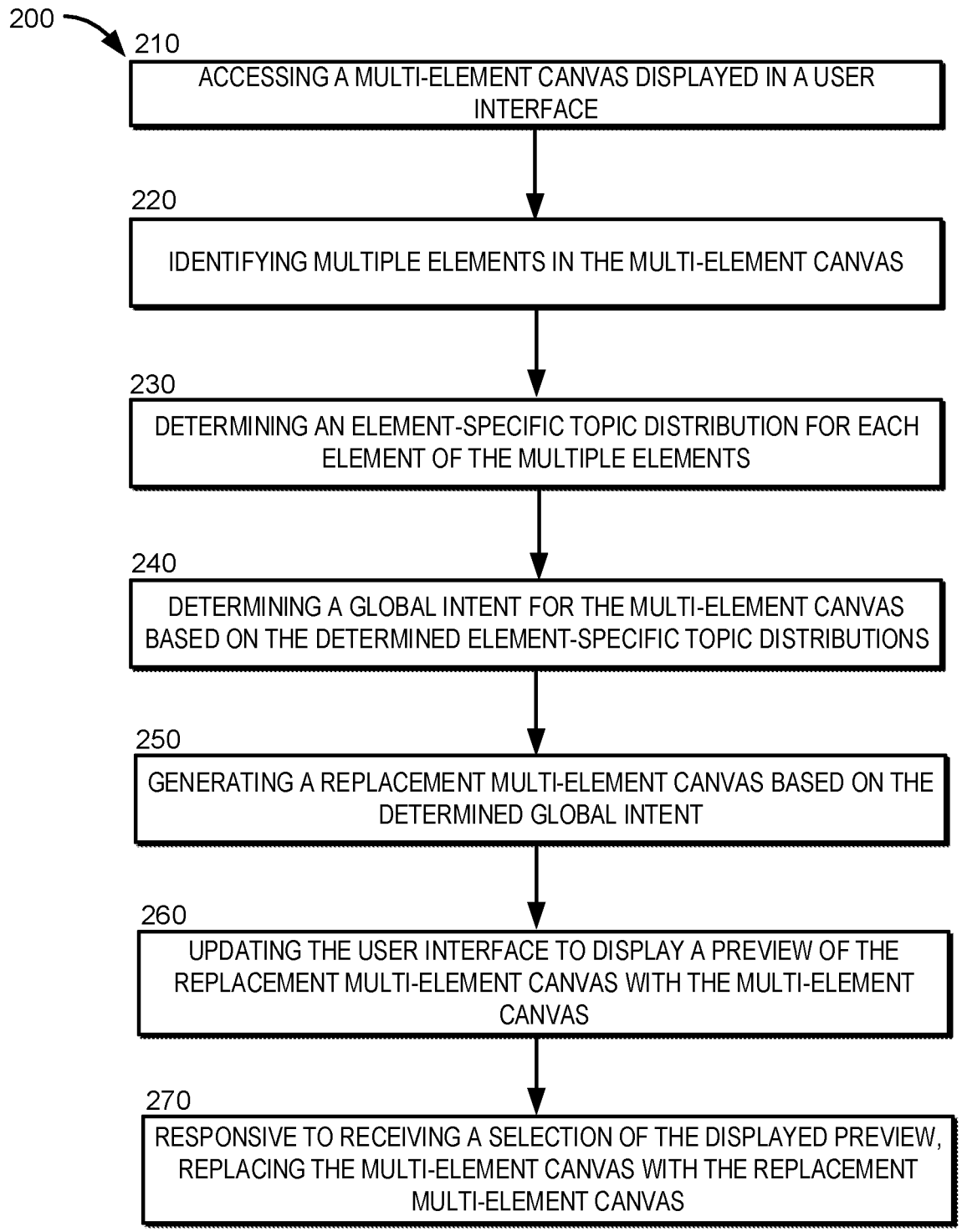
FIG. 2 depicts an example of a process for determining a global intent for a multi-element canvas and generating, based on the global intent, a preview of a suggested replacement multi-element canvas, according to certain embodiments disclosed herein.
Figure 5:
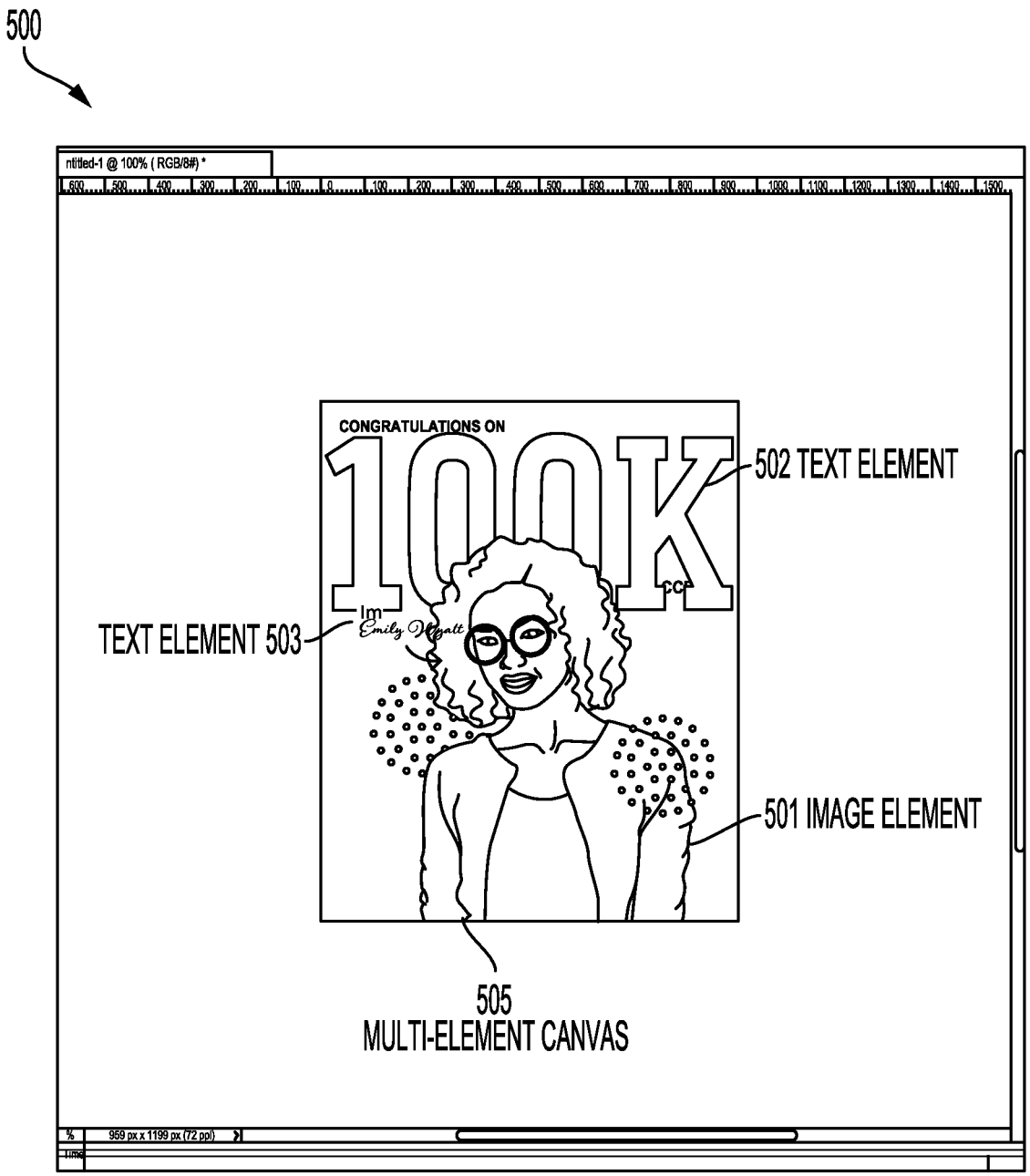
FIG. 5 depicts an illustration of an example multi-element canvas displayed in a user interface, according to certain embodiments disclosed herein.

In some examples, the illustrator system 120 comprises an intent determination module 121, a preview generator module 122, a document editing module 123, and a data storage unit 125. The illustrator system 120 accesses or otherwise receives a multi-element canvas 114 and determines a global intent 127 for the multi-element canvas 114. The illustrator system 120 may receive the multi-element canvas 114 from the illustrator application 119. FIG. 5 depicts an illustration of an example multi-element canvas displayed in a user interface, according to certain embodiments disclosed herein. The intent determination module 121 determines the global intent 127 for the multi-element canvas 114. FIG. 2 depicts an example method for determining a global intent 127 for a multi-element canvas 114, in accordance with certain embodiments described herein. In certain examples, the intent determination module 121 determines the global intent 127 based on element-specific topic distributions determined for a plurality of elements of the multi-element canvas 114. For example, the intent determination module 121 identifies a plurality of elements in the multi-element canvas 114 and determines, for each element of the plurality of elements, an element-specific topic distribution. In certain examples, the intent determination module 121 updates the illustrator application interface 113 to display the determined global intent 127 in a field or other area of the illustrator application interface 113.

In certain examples, the preview generator module 122 generates a replacement multi-element canvas 116 in which at least one element from the multi-element canvas 114 is substituted with a respective replacement element that is different from the corresponding at least one element in the multi-element canvas 114. In certain examples, the preview generator module 122 finds or otherwise generates candidate replacement elements based on the global intent 127 of the multi-element canvas 114 and selects the replacement element from the candidate replacement elements. In certain examples, the replacement element is an image element and the preview generator module 122 uses an optimization method to resize and/or shift the replacement image element so that a region of the replacement image element is aligned with a corresponding region of the image element of the multi-element canvas 114.

In certain examples, the preview generator module 122 generates and displays a preview 115 associated with the replacement multi-element canvas 116. The preview is a user interface object displayed in the illustrator application interface 113 that provides a visual preview of the replacement multi-element canvas 116. In certain embodiments, the preview generator module 122 generates multiple previews (e.g. previews 115-1, 115-2, . . . 115-n) for the multi-element canvas 114, where each of the multiple previews 115 is associated with a respective replacement multi-element canvas 116. In the example depicted in FIG. 1, the preview 115-1 is associated with the replacement multi-element canvas 116. The preview generator module 122 updates the illustrator application interface 113 to display the multi-element canvas 114 along with the multiple generated previews 115.

In certain examples, the document editing module 123 receives, from the illustrator application 109, an input via the illustrator application interface 113 of a selection of a preview 115 associated with a replacement multi-element canvas 116. Responsive to receiving the selection of the preview, the document editing module 123 renders, on the client device 110 an updated illustrator application interface 113 including a display of the replacement multi-element canvas 116. In the example depicted in FIG. 1, responsive to the selection of the preview 115-1, the replacement multi-element canvas 116 is displayed in the illustrator application interface 113. In the example depicted in FIG. 1, previews 115-2 and other of n previews are associated with other replacement multi-element canvases.

The data storage unit 125 is a memory accessible to the illustrator system 120. The data storage unit 125 can store a multi-element canvas 114 and a global intent 127 determined for the multi-element canvas 114. The data storage unit 125, in some examples, includes a database of image elements from which the illustrator system 120 can retrieve candidate replacement image elements to use in generating a replacement multi-element canvas 116. The data storage unit 125 can store an element editing history for a multi-element canvas 114 that indicates, for each element, an indication of if and when the element has been edited. For example, the element editing history may provide a time-stamped editing history for each element of the multi-element canvas. The data storage unit 125 can store one or more replacement multi-element canvases 116 generated for a respective one or more previews 115.

Examples of Computer-Implemented Operations for Determining a Global Intent for a Multi-Element Canvas and Generating, Based on the Global Intent, a Preview of a Suggested Replacement Multi-Element Canvas FIG. 2 depicts an example of a process 200 for determining a global intent for a multi-element canvas and generating, based on the global intent, a preview of a suggested replacement multi-element canvas, in accordance with certain embodiments described herein. One or more computing devices (e.g., illustrator system 120 or the individual modules contained therein) implement operations depicted in FIG. 2. For illustrative purposes, the process 200 is described with reference to certain examples depicted in the figures. Other implementations, however, are possible.

At block 210, the method 200 involves accessing, by the intent determination module 121, a multi-element canvas 114 displayed in a user interface 111. In some examples, the multi-element canvas 114 is displayed in the illustrator application interface 113 of the illustrator application 119. For example, the illustrator application is associated with the illustrator system 120 and communicates with the illustrator system 120 via a network 130. The multi-element canvas 114 includes a plurality of elements. In some instances the multi-element canvas 114 is a layered document and the elements are a plurality of layers in the layered document. In some instances, elements can be regions of the multi-element canvas 114. The multi-element canvas 114 could be a slide in a slide presentation, a word processing document, or other document. Elements can include multiple image elements and/or text elements.

At block 220, the method 200 involves identifying, by the intent determination module 121, multiple elements in the multi-element canvas 114. For example, the multi-element canvas 114 could include a background layer, with a text layer in front of the background layer, and an image layer in front of the text layer. In some instances, elements can further include edits made to the multi-element canvas 114, including an addition of an element, a deletion of an element, a duplication of an element, modifying one or more features of an element (e.g. size, orientation, font size, color, or other feature), or other edits to one or more elements in the multi-element canvas. Certain elements of the multi-element canvas 114 may partially or completely overlap or occlude other elements of the multi-element canvas. For example, an image element or layer may partially or completely occlude a text element or layer, or vice versa. In certain examples, the intent determination module 121 identifies one or more elements in the multi-element canvas 114 based on metadata of a document associated with the multi-element canvas 114.

Figure 3:
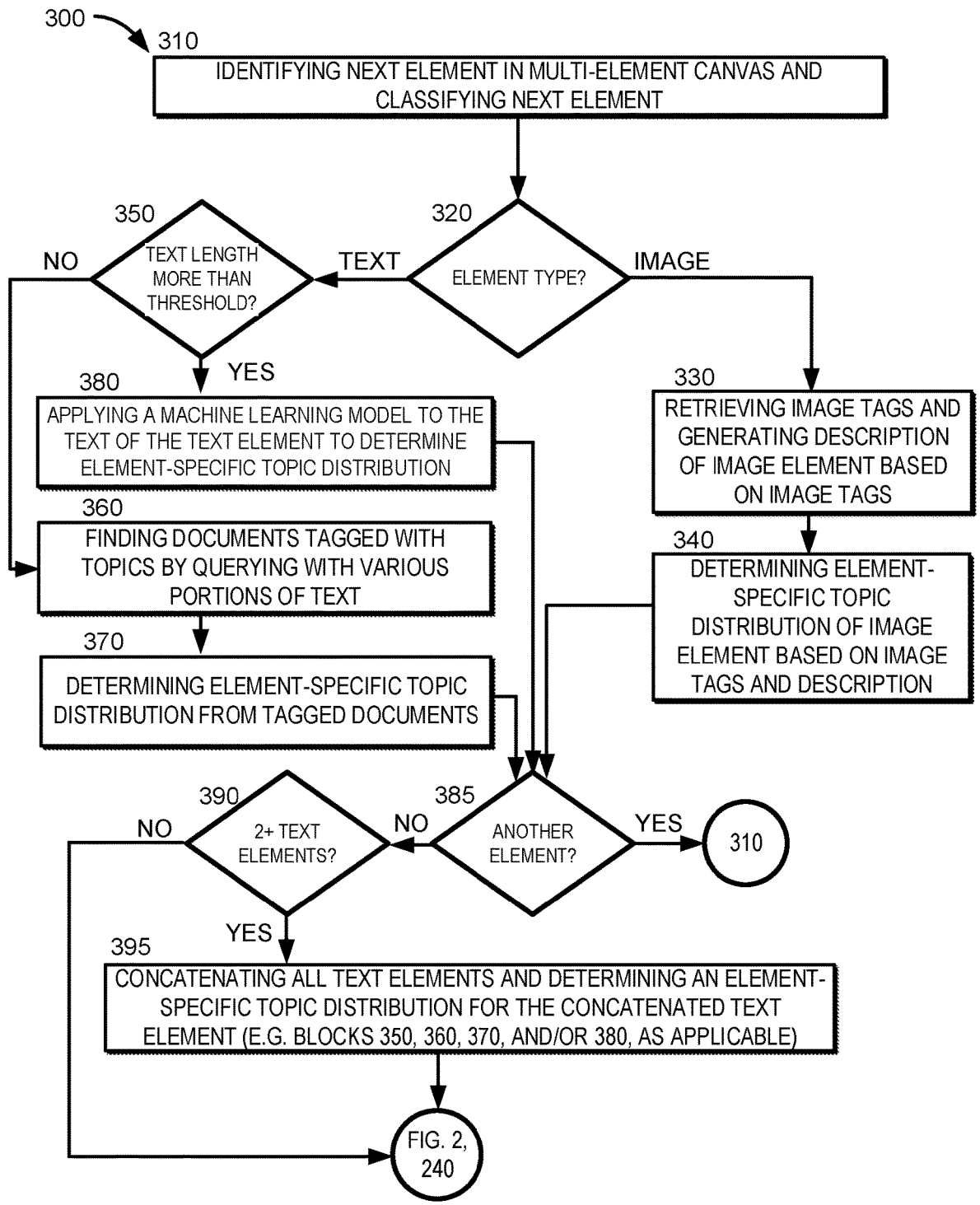
FIG. 3 depicts an example of a process for determining an element-specific intent for each detected element in a multi-element canvas, according to certain embodiments disclosed herein.

At block 230, the method 200 involves determining, by the intent determination module 121, an element-specific topic distribution for each element of the multi-element canvas 114. In certain examples, the element specific topic distribution is a list of topics associated with the element and a score for each of the topics. In certain examples, the intent determination module 121 applies various methods to determine the element-specific topic distribution for elements according to a type of each element. The score for each topic in the topic distribution could be based on how many times the associated topic is encountered in topic-tagged images from an image search using a description generated from tags associated with an image element. In another example, the score for each topic in the topic distribution could be based on how many times the associated topic is encountered in topic-tagged images from an image search for images using text from a text element. In another example, the score for each topic in the topic distribution could be predicted by a supervised machine learning model using a text of a text element as input. In some instances, the illustrator system concatenates all text elements (e.g. text layers, text objects, etc.) into a combined text and determines an element specific topic distribution for the combined text, including a list of topics and a score for each topic. In certain embodiments, the scores associated with topics in the determined element-specific topic distributions fall within a predefined range (e.g. 0 to 10, 0 to 100, or other predefined range). In certain embodiments, the illustrator system ranks the element-specific topic distributions based on their scores. FIG. 3 depicts an example process for determining an element-specific intent for each detected element in a multi-element canvas, according to certain embodiments disclosed herein.

Figure 4:
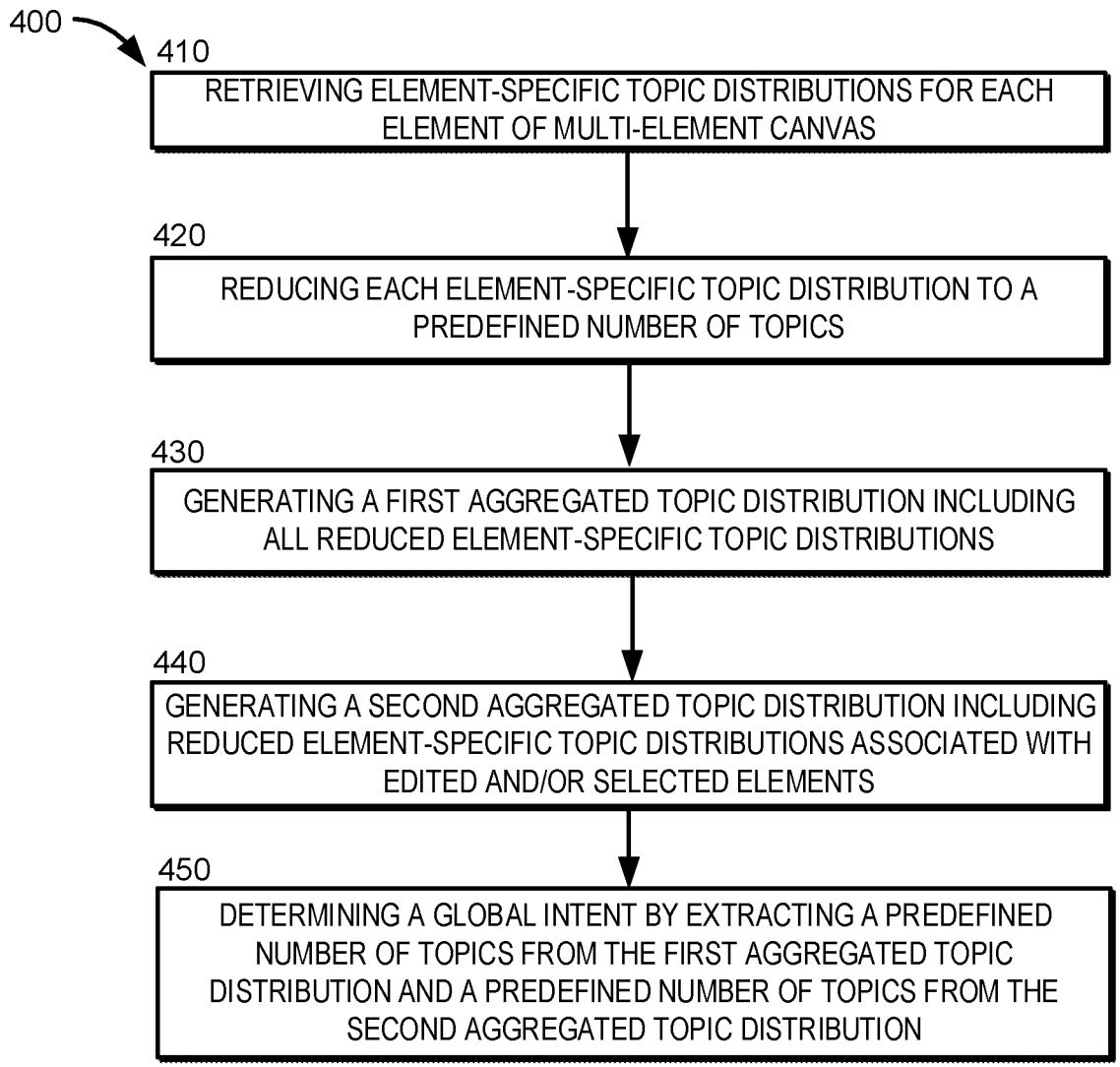
FIG. 4 depicts an example of a process for determining a global intent for a multi-element canvas based on element-specific intents determined according to FIG. 3, according to certain embodiments disclosed herein.

At block 240, the method 200 involves determining, by the intent determination module 121, a global intent 127 for the multi-element canvas 114 based on the determined element-specific topic distributions. To determine the global intent 127, the intent determination module 121 removes, from each element-specific topic distribution, all topics except for a predefined number of topics (e.g. three, five, ten, or other predefined number). For example, the intent determination module 121 may generate reduced element-specific topic distributions by removing all topics from each element-specific topic distribution except for the predefined number of topics having a greatest score associated with the respective topics. The intent determination module 121 creates a first aggregated topic distribution by combining the reduced element-specific topic distributions. The intent determination module 121 determines a subset of edited and/or displayed elements in the multi-element canvas 114 including (1) elements that have been edited within the multi-element canvas 114 and/or (2) elements that are currently selected (e.g. currently selected in the illustrator application interface 113 of the illustrator application 119 of the client device 110) in the multi-element canvas 114. The intent determination module 121 creates a second aggregated topic distribution by combining reduced element-specific topic distributions associated with each of the subset of edited and/or currently selected elements. In certain embodiments, the intent determination module 121 determines the global intent by combining a predefined number of topics (e.g. three topics) from the first aggregated topic distribution with a predefined number of topics (e.g. one topic) from the second aggregate topic distribution. FIG. 4 depicts an example of a process for determining a global intent 127 for a multi-element canvas 114 based on element-specific intents, according to certain embodiments disclosed herein. In certain examples, intent determination module 121 displays, via the illustrator application interface 113, the determined global intent 127. For example, the illustrator application interface 113 includes a field that displays the global intent 127 comprising a set of terms. In certain examples, the intent determination module 121 (or preview generator module 122) receives, via the illustrator application interface 113 (e.g. via an input to the field), a modification to the global intent 127. For example, the user of the illustrator application can replace one or more terms, delete one or more terms, change a spelling of one or more terms, change an order of one or more terms, add one or more terms, or otherwise modify the global intent 127.

At block 250, the method 200 involves generating, by the preview generator module 122, a replacement multi-element canvas 116 based on the determined global intent 127. In an example, the preview generator module 122 generates a replacement multi-element canvas 116 by creating a new canvas that includes one or more substitute elements (e.g. text elements, image elements, or other elements) that are similar to one or more elements of the multi-element canvas 114. The preview generator module 122 retrieves and/or generates the substitute elements. In certain examples, the preview generator module 122 queries an image database using one or more terms from the determined global intent 127. In certain examples, the preview generator module 122 receives an input to the illustrator application interface 113 modifying the global intent 127 and queries an image database using one or more terms from the modified global intent 127. The preview generator module 122 selects, from images returned in the image query, a substitute image element to use in the replacement multi-element canvas 116 that replaces an image element in the multi-element canvas 114. For example, the multi-element canvas 114 includes elements A, B, and C, and the replacement multi-element canvas 116 includes elements, A, B, and D, where element D has one or more similar visual features to element C but is not the same element as element C. In this example, element D is substituted, in the replacement multi-element canvas 116, for element C that is in the multi-element canvas 114. In some examples, to generate the replacement multi-element canvas 114, the preview generator module 122 substitutes a text element of particular characteristics (e.g. font, size, style, color, or other characteristic) of the multi-element canvas 114 with a substitute text element in the replacement multi-element canvas 116. In some examples, to generate the replacement multi-element canvas 114, the preview generator module 122 substitutes, in the replacement multi-element canvas 116, an image element that is in the multi-element canvas 114 with a substitute image element. In certain examples, the generation of the replacement multi-element canvas 116 maintains a layer order of the multi-element canvas 114. For example, if the multi-element canvas 114 includes an image layer on top of a text layer on top of a background layer, the replacement multi-element canvas 116 includes the same order of layers. In other examples, however, the preview generator module 122 may vary the layer order of the replacement multi-element canvas 116 from the layer order of the multi-element canvas 114.

At block 260, the method 200 involves updating, by the preview generator module 122, the user interface 111 to display a preview 115 of the replacement multi-element canvas 116 with the multi-element canvas 114. In some examples, the preview generator module 122 generates a preview 115 to display with the multi-element canvas in an illustrator application interface. The preview 115 is associated with a replacement multi-element canvas 116. When the preview 115 is selected via the illustrator application interface 113, the replacement multi-element canvas 116 associated with the selected preview 115 replaces the multi-element canvas 114 in the illustrator application interface 113. In certain examples, the illustrator system displays the preview 115 in the illustrator application interface 113 in which the multi-element canvas is displayed. The previews 115 are interface objects that provide an indication of a visual look of the replacement multi-element canvas. In some instances, multiple previews 115 can be displayed in the illustrator application interface 113 with the multi-element document 114, each of the multiple previews 115 (e.g. n previews 115-1, 115-2, . . . , 115-n) being associated with a respective replacement multi-element canvas 116 generated by the preview generator module 122. Responsive to receiving a selection of a preview 115 via the illustrator application interface 113, the document editing module 123 replaces the multi-element canvas 114 displayed in the illustrator application interface 113 with the replacement multi-element canvas 116 associated with the selected preview 115.

At block 270, the method 200 involves replacing, by the document editing module 123 responsive to receiving a selection of the displayed preview, the multi element canvas 114 with the replacement multi-element canvas 116. Responsive to receiving a selection of a preview 115 via the illustrator application interface 113, the document editing module 123 updates the illustrator application interface 113 to display the replacement multi-element canvas 116 associated with the selected preview 115 instead of the multi-element canvas 114. In an example, after performing blocks 210-270, the illustrator system 120 (e.g. one or more of the modules thereof) repeats block 220-260. In this example, the illustrator system 120 determines the global intent 127 for the replacement multi-element canvas 116, generates a subsequent replacement multi-element canvas 116 for the displayed replacement multi-element canvas 116, and displays a preview 115 for the subsequent replacement multi-element canvas 116. In this example, the illustrator system 120 displays the subsequent replacement multi-element canvas 116 in the illustrator application interface 113 to replace the previously displayed replacement multi-element canvas 116.

FIG. 3 depicts an example of a process 300 for determining an element-specific intent for each detected element in a multi-element canvas 114, in accordance with certain embodiments described herein. One or more computing devices (e.g., illustrator system 120 or the individual modules contained therein) implement operations depicted in FIG. 3. For illustrative purposes, the process 300 is described with reference to certain examples depicted in the figures. Other implementations, however, are possible. In certain examples, the method 300 is a method for implementing block 230 of FIG. 2.

In certain examples, in blocks 310-385, an intent determination module 121 determines, for each element of a multi-element canvas 114, an element-specific topic distribution. For each identified element, the intent determination module 121 selects a technique to determine an element-specific topic distribution based on a detected type of element (e.g. a text element of less than a threshold text length, a text element of greater than the threshold text length, an image element). The intent determination module 121 then applies the selected technique to determine the element-specific topic distribution for the element.

At block 310, the method 300 involves identifying, by an intent determination module 121, a next element in a multi-element canvas 114 and classifying the next element. The multi-element canvas 114 includes a plurality of elements. In some instances the multi-element canvas 114 is a layered document including a plurality of layers. Elements can include multiple image elements and/or text elements. Elements could include layers in the multi-element canvas 114. For example, the multi-element canvas 114 could include a background layer, with a text layer in front of the background layer, and an image layer in front of the text layer.

At block 320, the method 300 involves determining, by the intent determination module 121 a type for the identified element. In some instances, the intent determination module 121 determines that the identified next element is an image element. In some instances, the intent determination module 121 determines that the identified next element is a text element.

If the intent determination module 121 determines that the next element is an image element, the method 300 proceeds to block 330.

At block 330, the method 300 involves retrieving, by the intent determination module 121 image tags and generating image description of the image element based on the retrieved image tags. In certain examples, the image is a tagged image and the intent determination module 121 retrieves the image tags for the tagged image. The intent determination module 121 applies an application programming interface (API) or other method to generate a description from the image tags. For example, the intent determination module 121 could apply a Sensei API or use another method to determine an image description of a tagged image from a set of image tags.

At block 340, the method 300 involves determining, by the intent determination module 121, an element-specific topic distribution for the image element based on the image tags and the description. From the description generated from the image tags, the intent determination module 121 determines a list of topics using word embeddings. For example, word embeddings are learned representations for text that have a similar meaning have a similar representation. The intent determination module 121 identifies a list of topics from the description by mapping a list of word embeddings associated with topics to text in the description generated for the image. For example, the intent determination module 121 generates a list of topics that correspond to word embeddings that are mapped to the text in the description. In certain examples, the intent determination module 121 scores the list of topics according to a number of times the word embedding associated with the topic was mapped to text in the description. In certain examples, the score is normalized to fall within a predefined range (e.g. 0 to 10, 0 to 100, etc.) and the list of topics is ranked from a highest score representing a topic associated with a word embedding that was mapped to text in the description a greatest number of times and a lowest score representing a topic associated with a word embedding that was mapped to text in the description a least number of times.

From block 340, the method 300 proceeds to block 385. At block 385, the method 300 involves the intent determination module 121 determining if the multi-element canvas 114 includes remaining elements for which the intent determination module 121 has not determined an element-specific topic distribution. In certain examples, the intent determination module 121 determines, for each of the remaining elements in the multi-element document 114 an element-specific topic distribution according to blocks 310-385.

Returning to block 320, if the intent determination module 121 determines that the element is a text element, the method 300 proceeds to block 350.

At block 350, the method 300 involves determining, by the intent determination module 121 for a text element, if the text element includes a text that is greater than a threshold length. For example, the threshold length is a number of words. The number of words could be four, six, ten, or other predefined number of words.

If the intent determination module 121 determines that the text element includes a text that is less than the threshold length, the method 300 proceeds to block 360. For example, the threshold length is four words and the text element includes three words.

At block 360, the method 300 involves finding, by the intent determination module 121, documents tagged with topics by querying with various portions of the text. The intent determination module 121 searches a document database for tagged documents by querying with various portions of the text. In certain examples, a search application programming interface (search API) is used to query the document database to find the tagged documents. The documents could include image documents, word documents, are tagged with topic labels. The intent document model 121 retrieves a predefined number of the documents that are retrieved in the search results and extracts the topic labels from the retrieved tagged documents.

At block 370, the method 300 involves determining, by the intent determination module 121, an element-specific topic distribution for the text element from the tagged documents. In an example, the intent determination module 121 determines a topic label distribution in the retrieved, tagged documents. The topic label distribution, in some examples, is a list of topic labels and a score that indicates a number of each of the topic labels that was extracted from the retrieved tagged documents from querying the document database with the terms of the text element. In certain examples, the score is normalized to fall within a predefined range (e.g. 0 to 10, 0 to 100, etc.) and the list of topics is ranked from a highest score representing a topic that had a highest number of occurrences in the retrieved tagged documents and a lowest score representing a topic that had a lowest number of occurrences in the retrieved tagged documents.

From block 370, the method 300 proceeds to block 385. At block 385, the method 300 involves the intent determination module 121 determining if the multi-element canvas 114 includes remaining elements for which the intent determination module 121 has not determined an element-specific topic distribution. In certain examples, the intent determination module 121 determines, for each of the remaining elements in the multi-element document 114 an element-specific topic distribution according to blocks 310-385.

Returning to block 360, if the intent determination module 121 determines that the text element includes a text that is more than the threshold length, the method 300 proceeds to block 380. For example, the threshold length is four words and the intent determination module 121 determines that the text element is less than four words.

At block 380, the method 300 involves applying, by the intent determination module 121, a machine learning model to the text of the text element to determine an element-specific topic distribution. In certain examples, the intent determination module 121 trains an explicit supervised model that takes a text as input and determines, from the input text, a list of topics associated with the input text and a score associated with each topic in the list of topics. The explicit supervised model could be a transformer model, for example, a bidirectional encoder representations for transformers model (e.g. BERT, distilBERT, or other BERT-based model). In certain examples, the supervised model is configured to generate a score, for each topic in the list of topics, within a predefined range (e.g. 0 to 10, 0 to 100, etc.), with a highest score representing a topic most likely to be associated with the text element and a lowest score representing a topic that is least likely to be associated with the text element. The intent determination module 121 ranks the scored list of topics according to the score output by the supervised model. For example, the list of topics is ranked from highest score to lowest score.

From block 380, the method 300 proceeds to block 385.

At block 385, the method 300 involves determining, by the intent determination module 121, if the multi-element canvas 114 includes remaining elements for which the intent determination module 121 has not determined an element-specific topic distribution.

If the intent determination module 121 determines that the multi-element canvas 114 includes remaining elements for which the intent determination module 121 has not determined an element-specific topic distribution, the method 300 returns to block 310. For example, the intent determination module 121 determines, for each of the remaining elements in the multi-element document 114 an element-specific topic distribution according to blocks 310-385.

Returning to block 385, if the intent determination module 121 determines that the multi-element canvas 114 does not include remaining elements for which the intent determination module 121 has not determined an element-specific topic distribution, the method 300 proceeds to block 390. For example, the intent determination module 121 has determined element-specific topic distributions for each of the identified elements in the multi-element canvas 114.

At block 390, the method 300 involves determining, by the intent determination module 121, if multiple text elements are in the multi-element canvas 114. For example, the multi-element canvas 114 includes more than one text element (e.g. more than one text layer, text region, or other text).

In certain examples, if the intent determination module 121 determines that the multi-element canvas 114 does not include multiple text elements, the method 300 proceeds to block 240 of FIG. 2. For example, the multi-element canvas 114 includes a single text element and the rest of the elements in the multi-element canvas 114 are image elements or other non-text elements.

Returning to FIG. 3, at block 390, if the intent determination module 121 determines that the multi-element canvas 114 includes multiple text elements, the method 300 proceeds to block 395. For example, a first text element reads "Halloween party," a second text element reads "you are invited," a third text element reads "from the Smith family," and a fourth text element reads "RSVP Debbie Smith."

At block 395, the method 300 involves concatenating, by the intent determination module 121, all text elements and determining an element-specific topic distribution for the concatenated text element. For example, the method 300 involves applying one or more of blocks 350-380, as described herein, to determine the element-specific topic distribution for the concatenated text element. Continuing with the previous example, the intent determination module 121 may concatenate the first text element, the second text element, the third text element, and the fourth text element to generate the following concatenated text element "Halloween party you are invited from the Smith family RSVP Debbie Smith." In this example, the intent determination module 121 determines an element-specific topic distribution for this concatenated text object according to blocks 350-380 as described herein. For example, the element-specific topic distribution is determined according to blocks 360 and 370 if the concatenated text is less than or equal to a threshold length and is determined according to block 380 if the concatenated text is greater than the threshold length.

From block 395, in certain examples, the method 300 proceeds to block 240 of FIG. 2. For example, after determining an element-specific topic distribution for each element in the multi-element canvas 114, including a topic distribution from a concatenation of all text elements in the multi-element canvas 114, the intent determination module determines a global intent 127 for the multi-element canvas 114 based on the determined element-specific topic distributions.

FIG. 4 depicts an example of a process 400 for determining a global intent 127 for a multi-element canvas based on element-specific intents determined according to FIG. 3, in accordance with certain embodiments described herein. One or more computing devices (e.g., illustrator system 120 or the individual modules contained therein) implement operations depicted in FIG. 4. For illustrative purposes, the process 400 is described with reference to certain examples depicted in the figures. Other implementations, however, are possible. In certain examples, the process 400 is a method for implementing block 240 of FIG. 2.

At block 410, the method 400 involves retrieving, by the intent determination module 121, element-specific topic distributions for each element of the multi-element canvas 114. In certain examples, the multi-element canvas 114 includes multiple text elements and the intent determination module 121 also retrieves an element-specific topic distribution for a concatenated text element. In certain examples, the element specific topic distribution for the concatenated text element was determined according to block 380 of FIG. 3. In certain examples, each element-specific topic distribution is a ranked list of topics ranked from a highest score to a lowest score. The highest score could indicate that the intent determination module 121 encountered the topic a greatest number of times in tagged document search results after querying a database of tagged documents using a description generated for the element (e.g. for an image element) or using various portions of text associated with the element (e.g. for a text element). The lowest score could indicate that the intent determination module 121 encountered the topic least number of times in tagged document search results after querying a database of tagged documents using a description generated for the element (e.g. for an image element) or using various portions of text associated with the element (e.g. for a text element).

At block 420, the method 400 involves reducing, by the intent determination module 121, each element-specific topic distribution to a predefined number of topics. In certain examples, reducing an element-specific topic distribution comprises filtering the element-specific topic distribution to remove topics that are less than a threshold score or removing all topics except for a predefined number of topics. The predefined number of topics could be three topics, five topics, or other predefined number of topics. In an example, the element-specific topic distribution for an element of the multi-element canvas 114 includes a ranked list of five topics and the predefined number of topics is three topics. In this example, the intent determination module 121 retains a top three ranked topics in the ranked list of five topics and removes all other topics from the ranked list of topics. For example, the ranked list of topics for a particular element is, ranked from highest to lowest score, is "Halloween (5); party (3); birthday (2); family (1); scary (1)," where the numbers in parentheses represent the associated scores. In this example, the intent determination module 121 retains "Halloween (5); party (3); birthday (1)" in the ranked list of topics and removes "family (1); scary (1)" to generate a reduced element-specific topic distribution.

At block 430, the method 400 involves generating, by the intent determination module 121, a first aggregated topic distribution including all reduced element-specific topic distributions. For example, the intent determination module 121 generated a reduced element-specific topic distribution for each element of the multi-element canvas 114 in block 420, where each reduced element-specific topic distribution is a list of a predefined number (e.g. three) of the top-ranked topics associated with the element along with a score associated with each of the topics. The intent determination module 121 generates the first aggregated topic distribution by making a combined list of all of the reduced element-specific topic distributions, which are lists of the top-ranked predefined number of topics associated with each element, where each topic includes an associated score. In certain examples, the intent determination module 121 determines a score for each of the topics in the first aggregated topic distribution and ranks the first aggregated topic distribution from highest score to lowest score. The intent determination module 121 may merge any topics in the combined list of topics that occur multiple times and add the scores that were the basis for ranking the list. For example, the combined list includes "Halloween (8); invitation (5); family (4); birthday party (3) Halloween (2); celebration (2); birthday party (1)," where the numbers in parentheses represent associated scores, and the intent determination module 121 merges the duplicate topics to generate the following first aggregated topic distribution: "Halloween (10), invitation (5), family (4), birthday party (4), celebration (2)."

At block 440, the method 400 involves generating, by the intent determination module 121, a second aggregated topic distribution including reduced element-specific topic distributions associated with edited and/or selected elements. In certain examples, the intent determination module 121 accesses a document editing history of the multi-element canvas 114. For example, the document editing history may provide a time-stamped editing history for each element of the multi-element canvas. The intent determination module 121 using the document editing history determines one or more elements of the multi-element canvas 114 that have been edited. The intent determination module 121 could determine, from the time-stamped editing history associated with each element, which elements of the multi-element canvas 114 have been edited since the multi-element canvas 114 was first created, since the last time the multi-element canvas 114 was saved, within a last predefined period of time (e.g. a last five minutes, a last ten minutes), or other timeframe for considering which elements of the multi-element canvas have been edited. The intent determination module 121 also determines which elements in the multi-element canvas 114 are currently selected via the illustrator application interface 113. In certain examples, a currently selected element is a text that is entered into a text element. In an example, the intent determination module 121 makes a combined list of all of the reduced element-specific topic distributions for elements in the multi-element document 114 that have been edited or that are currently selected. In certain examples, the intent determination module 121 determine a score for each of the topics in the combined list and rank the topics in the combined list from highest score to lowest score. The intent determination module 121 may merge any topics in the combined list of topics that occur multiple times, add the scores that were the basis for ranking the list, and re-rank the list as necessary after merging duplicate topics and adding scores.

At block 450, the method 400 involves determining, by the intent determination module 121, a global intent 127 by extracting a predefined number of topics from the first aggregated topic distribution and a predefined number of topics from the second aggregated topic distribution. In some examples, the predefined number of topics from the first aggregated topic distribution is greater than the predefined number of topics from the second aggregated topic distribution. In other examples, the predefined number of topics from the second aggregated topic distribution is greater than the predefined number of topics from the first aggregated topic distribution. In certain examples, the extracted topics from the second aggregated topic distribution precede the extracted topics from the first aggregated topic distribution. However, in other examples, the extracted topics from the first aggregated topic distribution may precede the extracted topics from the second aggregated topic distribution. In an example, the first aggregated topic distribution is "Halloween (10), invitation (5), family (4), birthday party (4), celebration (2)," the second aggregated topic distribution is "birthday party (4) celebration (2)." In this example, the intent determination module selects three top ranked topics from the first aggregated topic distribution and one top ranked topic from the second aggregated topic distribution to generate the global intent 127, "Halloween invitation family birthday party."

FIG. 5 depicts an illustration of an example multi-element canvas 505 displayed in an illustrator application interface 500, according to certain embodiments disclosed herein. For illustrative purposes, FIG. 5 is described with reference to certain examples depicted in the figures. Other implementations, however, are possible. In FIG. 5, the illustrator application interface 500 is provided by an illustrator application 119 executing on a client device 110. The multi-element canvas 505 is a layered canvas that includes, among multiple elements, a background element layer, a text element 502 layer that reads "100K," a text element 503 that reads "I'm Emily Wyatt," and an image element 501 layer of a woman. As depicted in FIG. 5, the multi-element canvas 505 is layered such that the image element 501 is in front of the text element 502.

Figure 6:
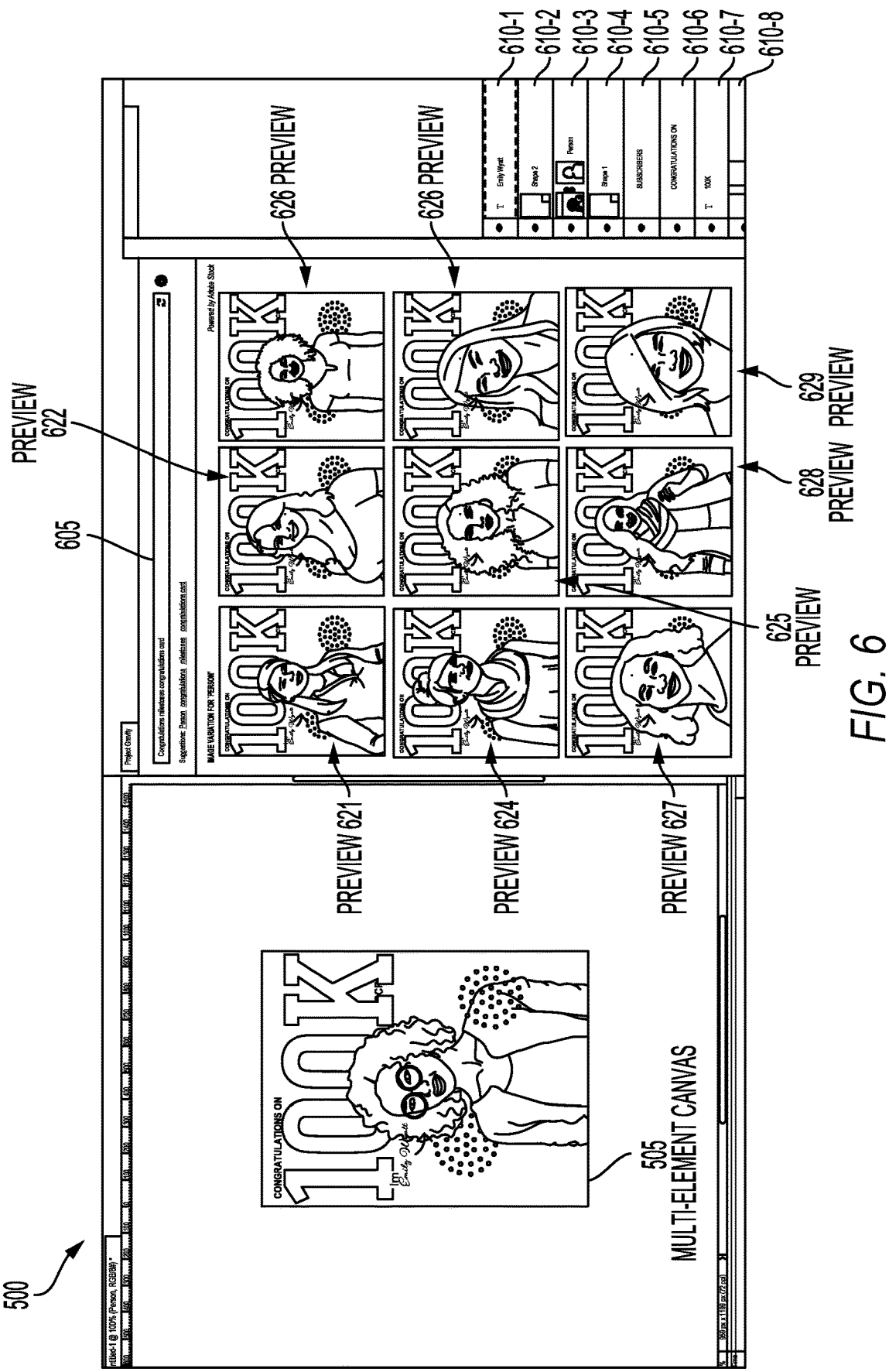
FIG. 6 depicts an illustration of the example multi-element canvas of FIG. 5 with previews of suggested replacement multi-element canvases, according to certain embodiments disclosed herein.

FIG. 6 depicts an illustration of the example multi-element canvas 505 of FIG. 5 with previews of suggested replacement multi-element canvases, according to certain embodiments disclosed herein. For illustrative purposes, FIG. 6 is described with reference to certain examples depicted in the figures. Other implementations, however, are possible. In FIG. 6, the illustrator application interface 500 is provided by an illustrator application 119 executing on a client device 110. As depicted, the multi-element canvas 505 is displayed within a section of the illustrator application interface 500. As depicted in FIG. 6, the illustrator application interface 113 displays a list of elements detected in the multi-element canvas, including elements 610-1, 610-2, 610-3, 610-4, 610-5, 610-6, 610-7, and 610-8. For example, the list of elements include a text element 610-1 ("I'm Emily Wyatt"), a masked image element 610-3, a text element 610-5 ("Subscribers"), a text element 610-6 ("Congratulations on"), a text element 610-7 ("100K"), and a background image element 610-8. The illustrator application interface 500 includes a global intent field 605 that displays a global intent 127, "Congratulations milestone congratulations card" determined by the illustrator system 120 for the multi-element canvas 505. Further, the illustrator application interface 500 includes a set of previews 621, 622, 623, 624, 625, 626, 627, 628, and 629, each displayed in a section of the illustrator application interface 500 as user interface objects. Each of the set of previews is associated with a respective replacement multi-element canvas 116 associated with the preview and provides a visual look of the replacement multi-element canvas 116. In certain examples, the illustrator system 120 generates each of the replacement canvases 116 according to method 200 described in FIG. 2. In the example depicted in FIG. 6, the illustrator application 119 is configured to display, responsive to receiving a selection of a particular preview (e.g. one of the previews 621, 622, 623, 624, 625, 626, 627, 628, and 629), a replacement multi-element canvas 116 associated with the selected preview 621 to replace the currently displayed multi-element canvas 114.

Figure 7:
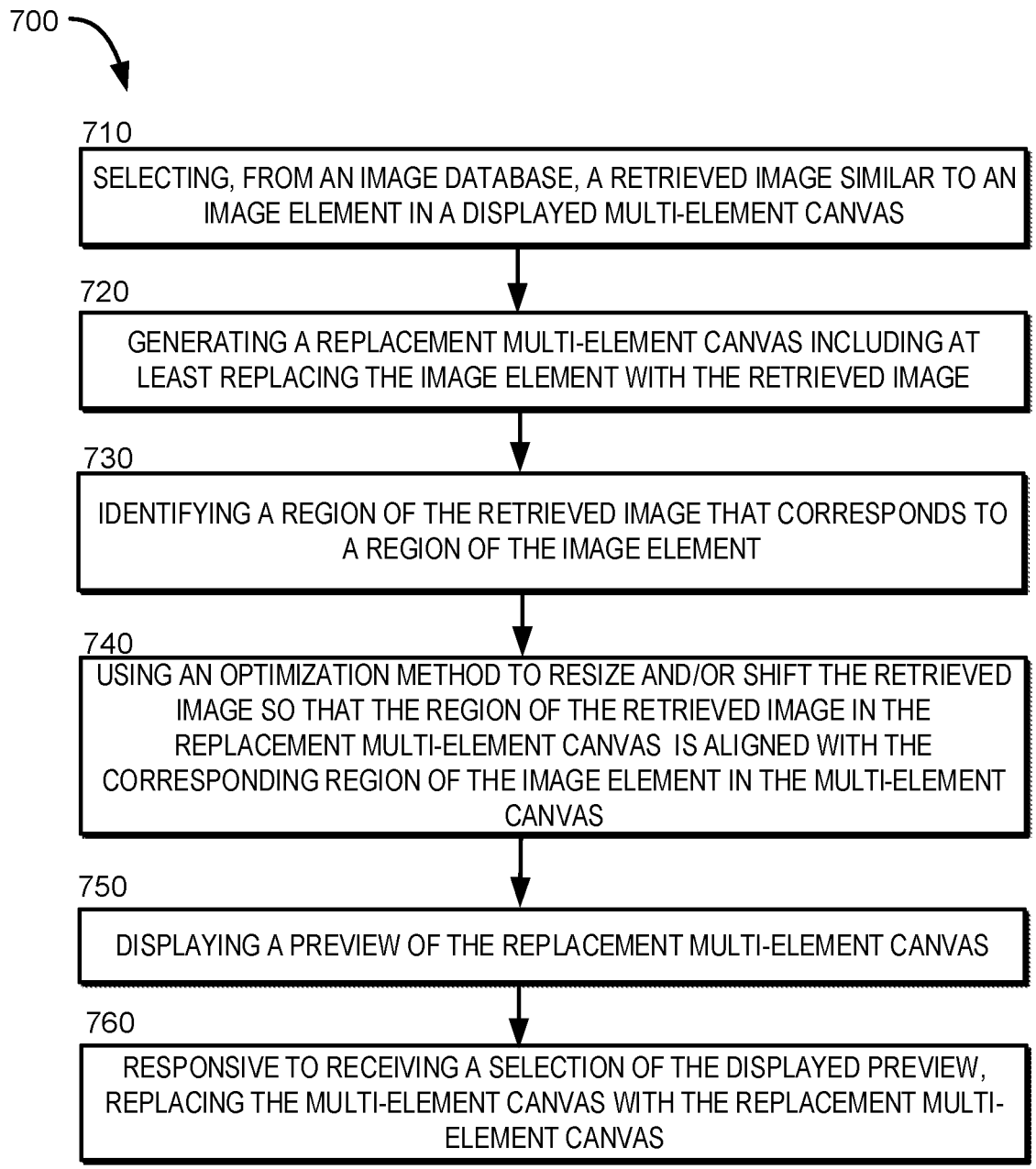
FIG. 7 depicts an example of a process for generating a preview of a suggested replacement multi-element canvas including a replacement image aligned with respect to an image element in a multi-element canvas, according to certain embodiments described herein.

FIG. 7 depicts an example of a process 700 for generating a preview of a suggested replacement multi-element canvas including a replacement image aligned with respect to an image element in a multi-element canvas, according to certain embodiments described herein. One or more computing devices (e.g., illustrator system 120 or the individual modules contained therein) implement operations depicted in FIG. 7. For illustrative purposes, the process 700 is described with reference to certain examples depicted in the figures. Other implementations, however, are possible.

At block 710, the method 700 involves selecting, by the preview generator module 122 from an image database, a retrieved image similar to an image element in a displayed multi-element canvas 114. In certain examples, the preview generator module 122 queries an image database for images and then selects, from the retrieved images, an image that is similar to the image element. In certain examples, the intent determination module 121 determines a global intent 127 for the multi-element canvas 114 according to the methods described in FIG. 2, FIG. 3, and FIG. 4 herein and the preview generator module 122 queries, using the global intent 127, the image database for images. In certain examples, the preview generator module 122 applies an image similarity analysis approach to identify an image from the retrieved images that is similar to the image element. In certain examples, the retrieved images are retrieved from an image database by querying the image database using a global intent 127 for the multi-element canvas 114 determined as described in FIG. 2, FIG. 3, and FIG. 4 herein.

At block 720, the method 700 involves generating, by the preview generator module 122, a replacement multi-element canvas including at least substituting the image element with the retrieved image. An example of generating a replacement multi-element canvas is described in block 250 of FIG. 2. In an example, the multi-element canvas 114 includes text element A, image element B, and background element C. In this example, the replacement multi-element canvas includes text element A, image element D (a retrieved image that is similar to image element B), and background element C. Accordingly, in this example, considering the differences between the multi-element canvas 114 and the replacement multi-element canvas 116, the image element B is substituted by (e.g. replaced by) the image element D in the replacement multi-element canvas 116.

At block 730, the method 700 involves identifying, by the preview generator module 122, a region of the retrieved image that corresponds to a region of the image element. For example, the preview generator module 122 detects a salient object or region in the retrieved similar image that corresponds to a salient object or region in the image element of the multi-element canvas 114. An example method for detecting an object or region in the retrieved similar image that corresponds to an object or region in the image element of the multi-element canvas 114 is described in FIG. 8. In an example, the multi-element canvas 114 includes an image layer having an image of a golden retriever and the retrieved image is an image of a golden retriever.

At block 740, the method 700 involves using, by the preview generator module 122, an optimization method to resize and/or shift the retrieved image so that the region of the retrieved image is aligned in the replacement multi-element canvas 116 with the corresponding region of the image element in the multi-element canvas 114. The preview generator module 122 may use a Newton optimization method or other optimization method. For example, the optimization iteratively resizes and/or shifts the retrieved image so that it can fill the corresponding region of multi-element canvas 114 that was occupied by the image element and also be similarly aligned (e.g. have a similar orientation to the object in the corresponding region of the image element). Continuing with a previous example, the multi-element canvas 114 includes an image layer having an image of a golden retriever that is level with a ground and the retrieved image is an image of a golden retriever that is tilted 45 degrees. In this example, the retrieved image is rotated 45 degrees so that the golden retriever region of the retrieved image is aligned with the golden retriever region of the image element. In certain examples, during application of the optimization method to align a retrieved image with respect to the image element in the multi-element canvas 114, the preview generator module 122 determines whether a mirror image of the retrieved image would provide for a better alignment and replaces the replacement image with the mirror image during application of the optimization method.

At block 750, the method 700 involves displaying, by the preview generator module 122, a preview of the replacement multi-element canvas 116. For example, the preview generator module 122 updates the user interface 111 to display a preview 115 of the replacement multi-element canvas 116 with the multi-element canvas 114. In some examples, the preview generator module 122 generates a preview 115 to display with the multi-element canvas in an illustrator application interface. The preview 115 is associated with a replacement multi-element canvas 116. When the preview 115 is selected via the illustrator application interface 113, the replacement multi-element canvas 116 associated with the selected preview 115 replaces the multi-element canvas 114 in the illustrator application interface 113. In certain examples, the illustrator system displays the preview 115 in the illustrator application interface 113 in which the multi-element canvas is displayed. The previews 115 are interface objects that provide an indication of a visual look of the replacement multi-element canvas. In some instances, multiple previews 115 can be displayed in the illustrator application interface 113 with the multi-element document 114, each of the multiple previews 115 (e.g. n previews 115-1, 115-2, . . . , 115-n) being associated with a respective replacement multi-element canvas 116 generated by the preview generator module 122. Responsive to receiving a selection of a preview 115 via the illustrator application interface 113, the document editing module 123 replaces the multi-element canvas 114 displayed in the illustrator application interface 113 with the replacement multi-element canvas 116 associated with the selected preview 115.

At block 760, the method 700 involves replacing, by the preview generator module 122 responsive to receiving a selection of the displayed preview, the multi-element canvas 114 with the replacement multi-element canvas 116. Responsive to receiving a selection of a preview 115 via the illustrator application interface 113, the document editing module 123 updates the illustrator application interface 113 to display the replacement multi-element canvas 116 associated with the selected preview 115 instead of the multi-element canvas 114. In an example, after performing blocks 210-270, the illustrator system 120 (e.g. one or more of the modules thereof) repeats block 220-260. In this example, the illustrator system 120 determines the global intent 127 for the replacement multi-element canvas 116, generates a subsequent replacement multi-element canvas 116 for the displayed replacement multi-element canvas 116, and displays a preview 115 for the subsequent replacement multi-element canvas 116. In this example, the illustrator system 120 displays the subsequent replacement multi-element canvas 116 in the illustrator application interface 113 to replace the previously displayed replacement multi-element canvas 116.

Figure 8:
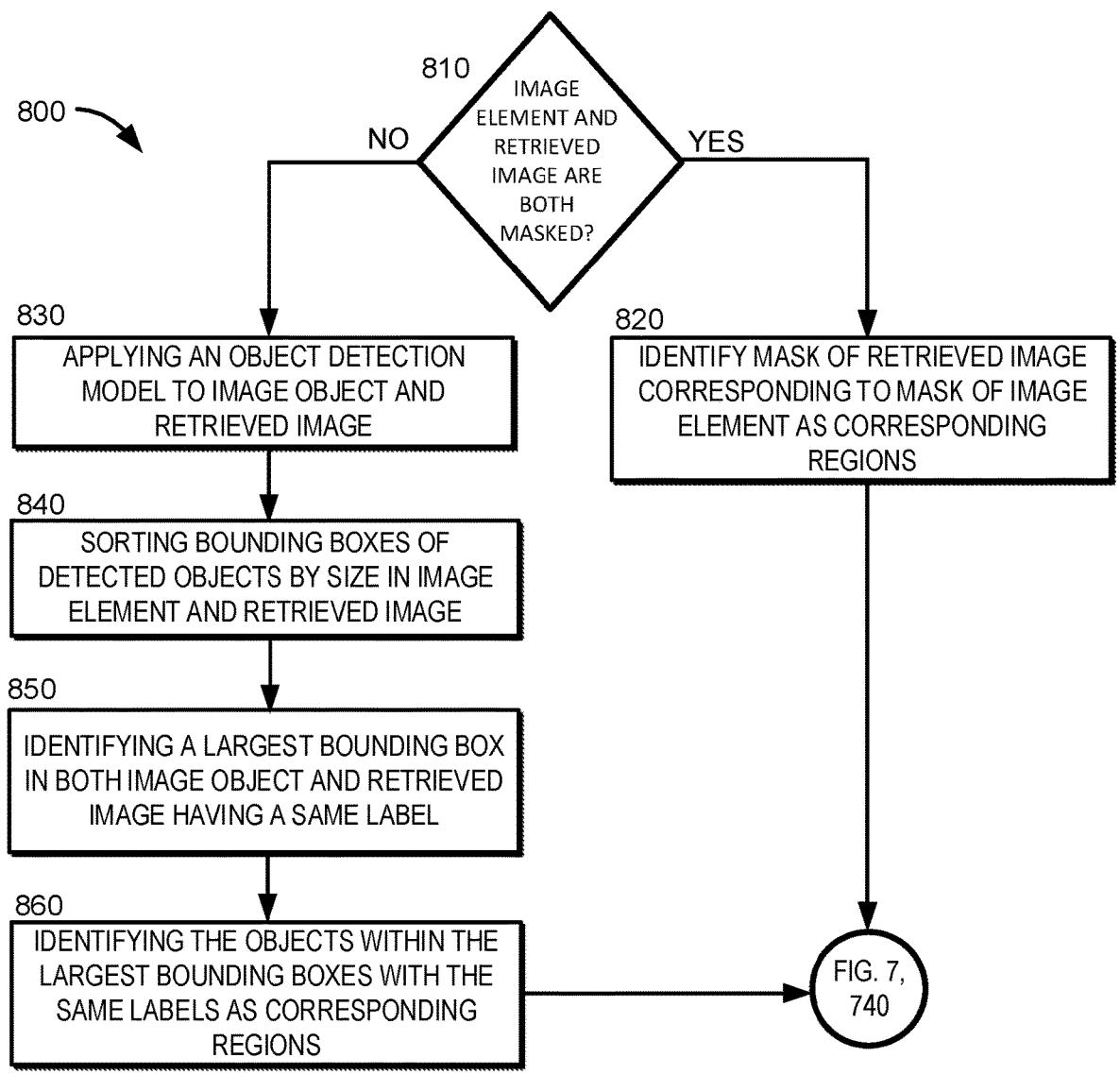
FIG. 8 depicts an example of a process for determining a correspondence between a region of interest in the replacement image and an image element in a multi-element canvas for aligning the replacement image in FIG. 7, according to certain embodiments described herein.

FIG. 8 depicts an example of a process 800 for determining a correspondence between a region of interest in the replacement image and an image element in a multi-element canvas for aligning the replacement image in FIG. 7. One or more computing devices (e.g., illustrator system 120 or the individual modules contained therein) implement operations depicted in FIG. 8. For illustrative purposes, the process 800 is described with reference to certain examples depicted in the figures. Other implementations, however, are possible. In certain examples, the process 800 is a method for implementing block 730 of FIG. 7. For example, the preview generator module 122 detects a salient object or region in the retrieved similar image that corresponds to a salient object or region in the image element of the multi-element canvas 114.

At block 810, the method 800 involves determining, by the preview generator module 122, whether both the image element in the multi-element canvas 114 and the retrieved image in the replacement multi-element canvas 116 are masked. In a masked image, a portion of an image is separated from its background. For example, in an image of a person standing on a beach, the region associated with the person can be separated from the beach scene (the background). In certain examples, a masked object is defined as a set of pixels associated with the masked object.

If the preview generator module 122 determines that both the image element in the multi-element canvas 114 and the retrieved image in the replacement multi-element canvas 116 are masked, the method 800 proceeds to block 820. For example, the image element in the multi-element canvas 114 includes a masked object and the replacement image includes a similar masked object.

At block 820, the method 800 involves identifying, by the preview generator module 122, a mask of the retrieved image corresponding to the mask of the image element as corresponding regions. From block 820, the method 800, in some examples, proceeds to block 760 of FIG. 7. For example, both the image element and the retrieved image include masked images.

Returning to block 810, if the preview generator module 122 determines that the image element in the multi-element canvas 114 is masked, the method 800 proceeds to block 830. In some instances, neither the image element in the multi-element canvas 114 nor the retrieved image in the replacement multi-element canvas 116 include masks or masked objects. In some instances, the image element in the multi-element canvas 114 includes a mask or a masked object but the retrieved image in the replacement multi-element canvas 116 does not include a mask or a masked object. In some instances, the image element in the multi-element canvas 114 does not a mask or a masked object but the retrieved image in the replacement multi-element canvas 116 includes a mask or a masked object.

In the example described in FIG. 8, in instances where one of either the image element or the replacement image includes a masked object, the preview generator module 122 may apply the object detection approach as described in blocks 830-860 to determine corresponding regions of interest in both the masked and the non-masked images. However, in some embodiments, in instances where one of either the image element or the replacement image includes a masked object, the preview generator module 122 may determine that the masked object is the region of interest in the masked image and then perform an object detection approach as described in blocks 830-860 to determine a corresponding region of interest in the non-masked image only.

At block 830, the method 800 involves applying, by the preview generator module 122, an object detection model to the image object and the retrieved image. The preview generator module 122, in some examples, applies an object detection model to both the image object and the retrieved object. The preview generator model 122 may detect multiple objects in each image along with bounding boxes defining boundaries of each detected object. An example of an object detection model is an encoder-decoder network. Other object detection models may be used. The preview generator module 122 assigns one or more categories to each detected object. In certain examples, categories of varying levels of specificity are assigned to detected object. For example, a golden retriever object detected in an image may be assigned labels "animal," "dog," "pet," and "golden retriever."

At block 840, the method 800 involves sorting, by the preview generator module 122, bounding boxes of detected objects by size in image element. The preview generator module 122 may determine an area of a bounding box associated with each detected object by multiplying a length of the bounding box by a width of the bounding box. The preview generator module 122 generates an object list of all objects detected in the image element of the multi-element canvas 114. The preview generator module 122 generates an object list of all objects detected in the retrieved image of the replacement multi-element canvas 116. The preview generator module 122 ranks each of the object lists according to an area of the bounding box associated with each object in the object list.

At block 850, the method 800 involves identifying, by the preview generator module 122, a largest bounding box in both the image element and the retrieved image having a same label. In an example, the preview generator module 122 identifies a first object associated with a largest bounding box in the image element of the multi-element canvas 114 and a second object associated with a largest bounding box in the retrieved image of the replacement multi-element canvas 116. In this example, the object in the retrieved image with the largest bounding box includes category labels, from least specific to most specific of "animal, dog, yellow dog, yellow labrador retriever," and the object in the image element having the largest bounding box includes category labels, from least specific to most specific, of "animal, dog, yellow dog, golden retriever." In this example, the preview generator module 122 compares the most specific category label "yellow labrador retriever" in the retrieved image to the most specific category label "golden retriever" in the image element and determines that the most specific category labels do not match. In this example, based on determining a non-match between the most specific category labels, the preview generator module 122 compares the next most specific category label "yellow dog" in the retrieved image to the most specific category label "yellow dog" in the image element and determines that the next most specific category labels match. In some instances, the objects with the largest bounding boxes in both the retrieved image and the image element have no corresponding labels and the preview generator module 122 compares category labels of an object with a second largest bounding box in the retrieved image with category labels of the object with the largest bounding box in the image element, or vice versa. When the preview generator module 122 finds a matching category label with objects (or regions) having the largest possible bounding box sizes, the preview generator module 122 designates the objects having matching category labels as corresponding objects or regions.

At block 860, the method 800 involves identifying, by the preview generator module, the objects within the largest bounding boxes with the same labels determined in block 850 as corresponding regions. Based on determining the match between the objects (or regions) with largest bounding boxes in the retrieved image and the image element, the preview generator module 122 designates the objects as corresponding objects or corresponding regions.

From block 860, the method 800 proceeds, in some examples, to block 740 of FIG. 7. For example, the preview generator module 122 uses the corresponding object or region in the image element as a basis to re-align and/or re-size the corresponding object or region in the retrieved image of the replacement multi-element canvas 116, as described in block 740 of FIG. 7.

Examples of Computing Environments for Implementing Certain Embodiments

Figure 9:
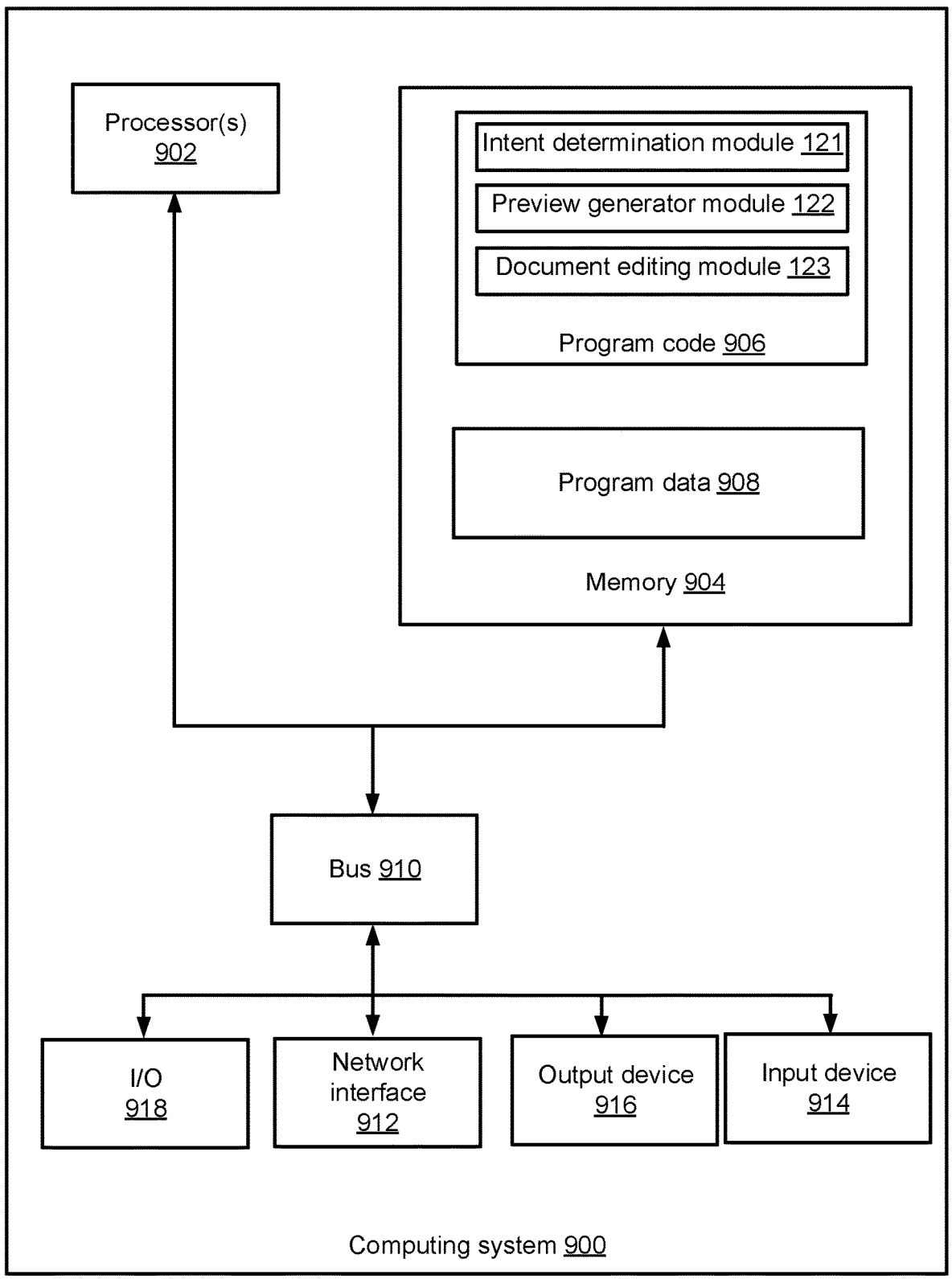
FIG. 9 depicts an example of a computing system that performs certain operations described herein, according to certain embodiments described in the present disclosure.

Any suitable computer system or group of computer systems can be used for performing the operations described herein. For example, FIG. 9 depicts an example of a computer system 900. The depicted example of the computer system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing program code 906, program data 908, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1104 can be volatile memory, non-volatile memory, or a combination thereof.

The computer system 900 executes program code 906 that configures the processor 902 to perform one or more of the operations described herein. Examples of the program code 906 include, in various embodiments, the intent determination module 121, preview generator module 122, and document editing module 123 of FIG. 1, which may include any other suitable systems or subsystems that perform one or more operations described herein (e.g., one or more neural networks, encoders, attention propagation subsystem and segmentation subsystem). The program code 906 may be resident in the memory device 904 or any suitable computer-readable medium and may be executed by the processor 902 or any other suitable processor.

The processor 902 is an integrated circuit device that can execute the program code 906. The program code 906 can be for executing an operating system, an application system or subsystem, or both. When executed by the processor 902, the instructions cause the processor 902 to perform operations of the program code 906. When being executed by the processor 902, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 904 store the program data 908 that includes one or more datasets described herein. In some embodiments, one or more of data sets are stored in the same memory device (e.g., one of the memory devices 904). In additional or alternative embodiments, one or more of the programs, data sets, models, and functions described herein are stored in different memory devices 904 accessible via a data network. One or more buses 910 are also included in the computer system 900. The buses 910 communicatively couple one or more components of a respective one of the computer system 900.

In some embodiments, the computer system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computer system 900 is able to communicate with one or more other computing devices via a data network using the network interface device 912.

The computer system 900 may also include a number of external or internal devices, an input device 914, a presentation device 916, or other input or output devices. For example, the computer system 900 is shown with one or more input/output ("I/O") interfaces 918. An I/O interface 918 can receive input from input devices or provide output to output devices. An input device 914 can include any device or group of devices suitable for receiving visual, auditory, or other suitable input that controls or affects the operations of the processor 902. Non-limiting examples of the input device 914 include a touchscreen, a mouse, a keyboard, a microphone, a separate mobile computing device, etc. A presentation device 916 can include any device or group of devices suitable for providing visual, auditory, or other suitable sensory output. Non-limiting examples of the presentation device 916 include a touchscreen, a monitor, a speaker, a separate mobile computing device, etc.

Although FIG. 9 depicts the input device 914 and the presentation device 916 as being local to the computer system 900, other implementations are possible. For instance, in some embodiments, one or more of the input device 914 and the presentation device 916 can include a remote client-computing device that communicates with computing system 900 via the network interface device 912 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 10:
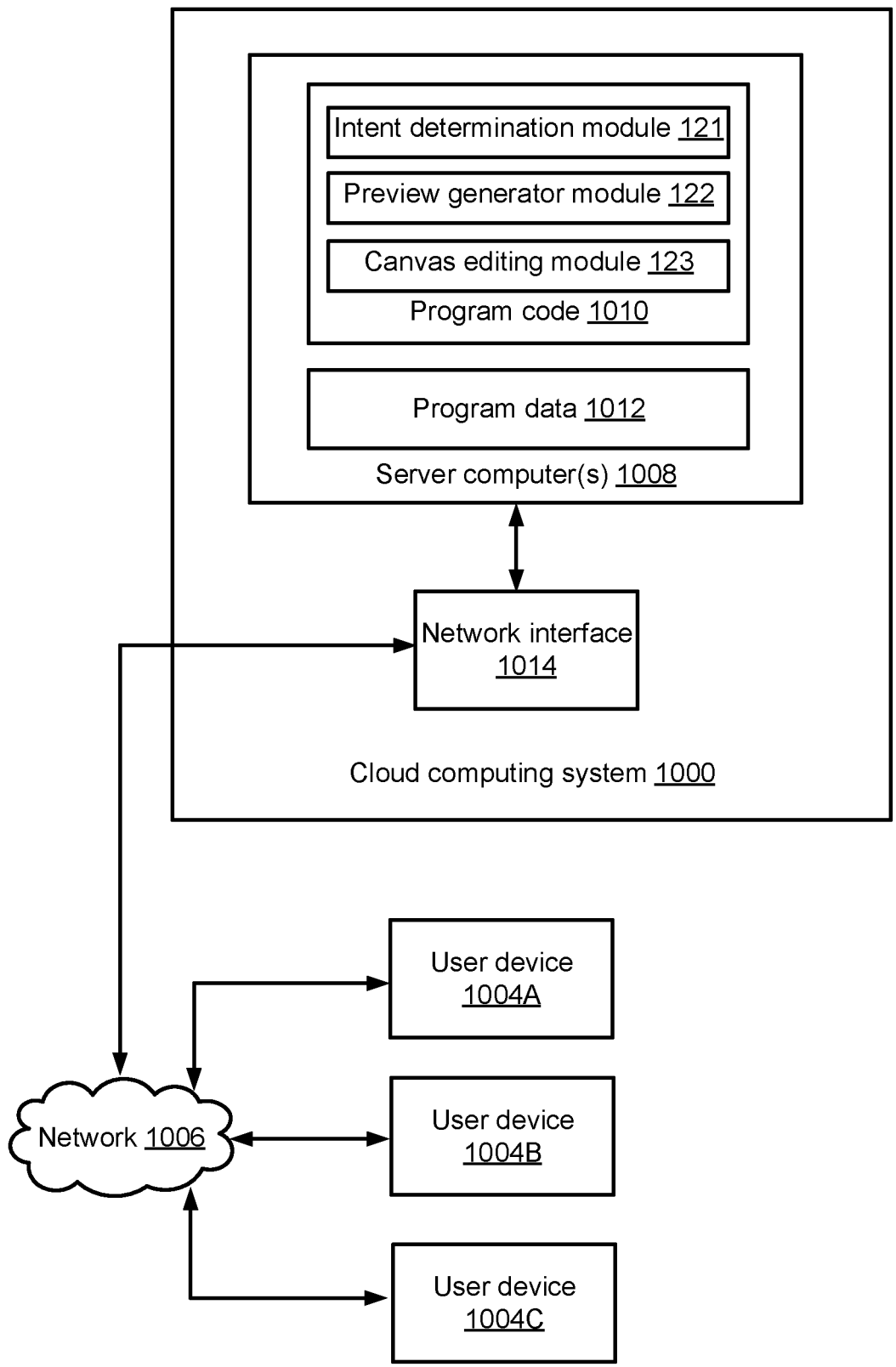
FIG. 10 an example of a cloud computing system that performs certain operations described herein, according to certain embodiments described in the present disclosure.

In some embodiments, the functionality provided by computer system 900 may be offered as cloud services by a cloud service provider. For example, FIG. 10 depicts an example of a cloud computer system 1000 offering a service for determining a global intent 127 for a multi-element canvas 114 and a service for generating previews of replacement multi-element canvases 116 for a multi-element canvas 114, that can be used by a number of user subscribers using user devices 1004A, 1004B, and 1004C across a data network 1006. In the example, the service for generating previews of replacement multi-element canvases 116 for a multi-element canvas 114 may be offered under a Software as a Service (SaaS) model. One or more users may subscribe to the service for determining a global intent 127 for a multi-element canvas 114 and the service for generating previews of replacement multi-element canvases 116 for a multi-element canvas 114, and the cloud computer system 1000 performs the processing to provide the service for determining a global intent 127 for a multi-element canvas 114 and the service for generating previews of replacement multi-element canvases 116 for a multi-element canvas 114 to subscribers. The cloud computer system 1000 may include one or more remote server computers 808.

The remote server computers 1008 include any suitable non-transitory computer-readable medium for storing program code 1010 (e.g., the intent determination module 121, the preview generator module 122, and the document editing module 123 of FIG. 1) and program data 1012, or both, which is used by the cloud computer system 1000 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 508 can include volatile memory, non-volatile memory, or a combination thereof One or more of the server computers 1008 execute the program code 1010 that configures one or more processors of the server computers 1008 to perform one or more of the operations that determine a global intent 127 for a multi-element canvas 114 and generate previews of replacement multi-element canvases 116 for a multi-element canvas 114. As depicted in the embodiment in FIG. 10, the one or more servers providing the service for determining a global intent 127 for a multi-element canvas 114 and the service for generating previews of replacement multi-element canvases 116 for a multi-element canvas 114 may implement the intent determination module 121, the preview generator module 122, and the document editing module 123. Any other suitable systems or subsystems that perform one or more operations described herein (e.g., one or more development systems for configuring an interactive user interface) can also be implemented by the cloud computer system 1000.

In certain embodiments, the cloud computer system 1000 may implement the services by executing program code and/or using program data 1012, which may be resident in a memory device of the server computers 1008 or any suitable computer-readable medium and may be executed by the processors of the server computers 1008 or any other suitable processor.

In some embodiments, the program data 1012 includes one or more datasets and models described herein. In some embodiments, one or more of data sets, models, and functions are stored in the same memory device. In additional or alternative embodiments, one or more of the programs, data sets, models, and functions described herein are stored in different memory devices accessible via the data network 1006.

The cloud computer system 1000 also includes a network interface device 1014 that enable communications to and from cloud computer system 1000. In certain embodiments, the network interface device 1014 includes any device or group of devices suitable for establishing a wired or wireless data connection to the data networks 1006. Non-limiting examples of the network interface device 1014 include an Ethernet network adapter, a modem, and/or the like. The service for determining a global intent 127 for a multi-element canvas 114 and the service for generating previews of replacement multi-element canvases 116 for a multi-element canvas 114 is able to communicate with the user devices 1004A, 1004B, and 1004C via the data network 1006 using the network interface device 1014.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which one or more processing devices perform operations comprising:
   accessing a layered multi-element document, the layered multi-element document including a plurality of elements, wherein the elements comprise layers, wherein the plurality of elements comprises a plurality of image elements;
   determining, for each of the plurality of elements, an element-specific topic distribution comprising a ranked list of topics, wherein the element-specific topic distribution for each image element is determined based at least on one or more tags extracted from the image element;
   creating a first aggregated topic distribution by aggregating the determined element-specific topic distributions;
   determining a global intent for the layered multi-element document, the global intent comprising a predefined number of terms from the element-specific topic distributions;
   querying a database using the global intent to retrieve a substitute image element; and
   generating a replacement layered multi-element document that includes the substitute image element in place of an image element of the plurality of image elements in the layered multi-element document, wherein the substitute image element is different from the image element.

2. The computer-implemented method of claim 1, wherein the layered multi-element document comprises a layered canvas.

3. The computer-implemented method of claim 1, the operations further comprising:
generating a second aggregated topic distribution from a subset of the determined element-specific topic distributions, the subset associated with elements in the layered multi-element document that have been selected or edited by a user,
wherein the global intent further comprises one or more terms from the second aggregated topic distribution.

4. The computer-implemented method of claim 1, wherein determining, for each image element of the plurality of image elements, the element-specific topic distribution comprising the list of topics comprises:
extracting, from the image element, the one or more tags;
applying a machine learning model to the one or more tags to generate a description;
querying the database using the generated description to retrieve documents, the documents including topic labels; and
wherein the ranked list of topics comprises a list of topics ranked according to a number of topic labels associated with each topic in the retrieved documents.

5. The computer-implemented method of claim 1, wherein at least one of the plurality of elements comprises a text element and wherein determining, for each text element of the plurality of elements, the element-specific topic distribution comprising the ranked list of topics comprises:
applying a machine learning model to text associated with the text element to generate the ranked list of topics.

6. The computer-implemented method of claim 1, wherein at least one of the plurality of elements comprises a text element and wherein determining, for each text element of the plurality of elements, the element-specific topic distribution comprising the list of topics comprises:
querying the database using text of the text element to retrieve documents, the documents including topic labels; and
wherein the ranked list of topics comprises a list of topics ranked according to a number of topic labels associated with each topic in the retrieved documents.

7. The computer-implemented method of claim 1, wherein the plurality of elements comprises two or more text elements, the operations further comprising:
generating a concatenated text element by concatenating text associated with the two or more text elements; and
determining an element-specific topic distribution for the concatenated text element, wherein the first aggregated topic distribution is further created from the element-specific topic distribution for the concatenated text element.

8. The computer-implemented method of claim 1, wherein the image element is a first image element and the substitute image element is a second image element, wherein generating the replacement layered multi-element document that includes the substitute image element in place of the image element in the layered multi-element document further comprises:
identifying a region of the second image element that corresponds to a region of the first image element; and
using an optimization method, iteratively performing one or more of resizing or shifting the second image element so that the region of the second image element in the replacement layered multi-element document is aligned with respect to the first image element in the layered multi-element document.

9. The computer-implemented method of claim 8, wherein identifying the region of the second image element comprises identifying a masked object in the second image element, wherein identifying the region of the first image element comprises identifying a masked object in the first image element.

10. The computer-implemented method of claim 8, wherein identifying the region in the first image element and the region of the second image element comprises
applying, to each of the first image element and the second image element, an object recognition algorithm to detect objects in each of the first image element and the second image element including at least a first object and a second object;
determining one or more category labels for each detected object of the detected objects in each of the first image element and the second image element ; and
determining that the first object is the region of the first image element and the second object is the region of the second image element in response to identifying a common object category label between the first object and the second object.

11. The computer-implemented method of claim 10, the operations further comprising:
determining a bounding box associated with each detected object in the first image element and in the second image element; and
wherein the determining that the first object is the region of the first image element and the second object is the region of the second image element is performed further in response to determining that the first object has a greatest bounding box area among the identified objects in the first image element and that the second object has a greatest bounding box area among the identified objects in the second image element.

12. The computer-implemented method of claim 1, further comprising:
displaying, via a user interface with the multi-element document, a preview of the replacement layered multi-element document providing a view of the replacement layered multi-element document; and
responsive to receiving a selection via the user interface of the preview, updating the user interface to display the replacement layered multi-element document instead of the layered multi-element document.

13. The computer-implemented method of claim 1, the operations further comprising:
displaying, via a user interface with the layered multi-element document, the determined global intent; and
receiving, via the user interface, a modification to the determined global intent, wherein querying the database using the global intent comprises querying the database using the modified global intent.

14. A system comprising:
processing hardware; and
a non-transitory computer-readable medium communicatively coupled to the processing hardware, wherein the non-transitory computer-readable medium comprises computer-readable program instructions that, when executed by the processing hardware, cause the system to:
access a layered multi-element document displayed in a user interface, the layered multi-element document including a plurality of elements, wherein the plurality of elements comprises a plurality of image elements;
determine, for each of the plurality of elements, an element-specific topic distribution comprising a ranked list of topics, wherein the element-specific topic distribution for each image element is determined based at least on one or more tags extracted from the image element;
create a first aggregated topic distribution by aggregating the determined element-specific topic distributions;
determine a global intent for the layered multi-element document, the global intent comprising a predefined number of terms from the element-specific topic distributions;
query a database using the global intent to retrieve a substitute image element;
generate a replacement layered multi-element document that includes the substitute image element in place of an image element of the plurality of image elements in the layered multi-element document, wherein the substitute image element is different from the image element;
display, via the user interface with the multi-element document, a preview of the replacement layered multi-element document providing a view of the replacement layered multi-element document; and
update, responsive to receiving a selection via the user interface of the preview, the user interface to display the replacement layered multi-element document instead of the layered multi-element document.

15. The system of claim 14, wherein the non-transitory computer-readable medium further comprises computer-readable program instructions that, when executed by the processing hardware, cause the system to:
generate a second aggregated topic distribution from a subset of the determined element-specific topic distributions, the subset associated with elements in the layered multi-element document that have been selected or edited by a user,
wherein the global intent further comprises one or more terms from the second aggregated topic distribution.

16. The system of claim 14, wherein the non-transitory computer-readable medium further comprises computer-readable program instructions that, when executed by the processing hardware, cause the system to:
display, via a user interface with the layered multi-element document, the determined global intent; and
receive, via the user interface, a modification to the determined global intent, wherein querying the database using the global intent comprises querying the database using the modified global intent.

17. The system of claim 14, wherein the element is a first image element and the substitute image element is a second image element, wherein generating the replacement layered multi-element document that includes the substitute image element in place of an image element in the multi-element document further comprises:

identifying a region of the second image element that corresponds to a region of the first image element; and
using an optimization method, iteratively performing one or more of resizing or shifting the second image element so that the region of the second image element in the replacement layered multi-element document is aligned with respect to the first image element in the layered multi-element document.

18. A non-transitory computer-readable medium having program code that is stored thereon, the program code executable by one or more processing devices for performing operations comprising:
determining, for each of a plurality of elements of a layered multi-element document displayed in a user interface, an element-specific topic distribution comprising a ranked list of topics, the plurality of elements comprising a plurality of image elements, wherein the element-specific topic distribution for each image element of the plurality of image elements is determined based at least on one or more tags extracted from the image element;
creating a first aggregated topic distribution by aggregating the determined element-specific topic distributions;
determining a global intent for the layered multi-element document, the global intent comprising a predefined number of terms from the element-specific topic distributions;
querying a database using the global intent to retrieve a substitute image element;
generating a replacement layered multi-element document that includes the substitute image element in place of an image element of the plurality of image elements in the multi-element document, wherein the substitute image element is different from the image element;
displaying, via the user interface with the multi-element document, a preview of the replacement layered multi-element document providing a view of the replacement layered multi-element document; and
updating, responsive to receiving a selection via the user interface of the preview, the user interface to display the replacement layered multi-element document instead of the layered multi-element document.

19. The non-transitory computer-readable medium of claim 18, the operations further comprising:
generating a second aggregated topic distribution from a subset of the determined element-specific topic distributions, the subset associated with elements in the layered multi-element document that have been selected or edited by a user,
wherein the global intent further comprises one or more terms from the second aggregated topic distribution.

20. The non-transitory computer-readable medium of claim 18, the operations further comprising:
displaying, via a user interface with the layered multi-element document, the determined global intent; and
receiving, via the user interface, a modification to the determined global intent, wherein querying the database using the global intent comprises querying the database using the modified global intent.

\* \* \* \* \*